(12) United States Patent  
Burkinshaw

(10) Patent No.: US 9,945,072 B2
(45) Date of Patent: Apr. 17, 2018

(54) METHOD FOR COLORATION AND TREATMENT OF SUBSTRATES

(71) Applicant: University of Leeds, Leeds Yorkshire (GB)

(72) Inventor: Stephen Martin Burkinshaw, Leeds (GB)

(73) Assignee: University of Leeds, Yorkshire Leeds (GB)

( * ) Notice: Subject to any disclaimer, the term of this patent is extended or adjusted under 35 U.S.C. 154(b) by 65 days.

(21) Appl. No.: 14/779,102

(22) PCT Filed: Mar. 25, 2014

(86) PCT No.: PCT/GB2014/050948
§ 371 (c)(1),
(2) Date: Sep. 22, 2015

(87) PCT Pub. No.: WO2014/155101
PCT Pub. Date: Oct. 2, 2014

(65) Prior Publication Data
US 2016/0047088 A1 Feb. 18, 2016

(30) Foreign Application Priority Data
Mar. 25, 2013 (GB) .................................. 1305416.8

(51) Int. Cl.
*D06P 3/79* (2006.01)
*D06P 1/96* (2006.01)
(Continued)

(52) U.S. Cl.
CPC ............ *D06P 1/96* (2013.01); *D06B 19/0088* (2013.01); *D06B 21/02* (2013.01); *D06M 23/08* (2013.01);
(Continued)

(58) Field of Classification Search
CPC . D06P 1/00; D06P 1/96; D06P 1/0024; D06B 19/0088; D06B 21/02; Y02P 70/643
See application file for complete search history.

(56) References Cited

U.S. PATENT DOCUMENTS 4,501,591 A 2/1985 Ucci et al.

FOREIGN PATENT DOCUMENTS

GB  1371781  * 10/1974 ................ D06P 7/00
GB  1371781 A  10/1974
(Continued)

*Primary Examiner* — Eisa B Elhilo
(74) *Attorney, Agent, or Firm* — Nexsen Pruet, PLLC; E. Eric Mills

(57) ABSTRACT

The invention provides a method for the application of a treatment agent to a substrate, the method comprising the treatment of the pre-wetted substrate in an aqueous system comprising the solid particulate treatment agent in a closed container, the treatment being carried out at a ratio of liquor to substrate which does not exceed 2:1. Typically, the method is applied to the dyeing of textile fibres at liquor ratios of ≤1:1 and is carried out in the absence of additives conventionally included for the sole purpose of promoting dye uptake by controlling electrical interactions or otherwise enhancing interactions between the substrate and the treatment agent. The invention also provides a method for the removal of surplus treatment agents following application of said treatment agents to a substrate, said method comprising not more than three wash-off treatments of said substrate with water following said application. Said wash off process most particularly comprises a two-stage process comprising performing, in order, the steps of: a first wash-off of the treated substrate with water in a closed container at a ratio of water to substrate which does not exceed 5:1; and a second wash-off of the treated substrate with water in a closed container at a ratio of water to substrate which does not exceed 10:1.

21 Claims, 9 Drawing Sheets

DYEING METHOD ACCORDING TO THE INVENTION

(51) Int. Cl.
*D06B 19/00* (2006.01)
*D06M 23/08* (2006.01)
*D06P 1/00* (2006.01)
*D21H 21/50* (2006.01)
*D06B 21/02* (2006.01)

(52) U.S. Cl.
CPC .............. *D06P 1/00* (2013.01); *D06P 1/0024* (2013.01); *D21H 21/50* (2013.01); *Y02P 70/643* (2015.11)

(56) References Cited

FOREIGN PATENT DOCUMENTS

| | | | |
|---|---|---|---|
| GB | 1411557 | A | 10/1975 |
| GB | 1419125 | A | 12/1975 |
| JP | S57121677 | A | 7/1982 |
| JP | H0424295 | A | 1/1992 |
| JP | H0657661 | A | 3/1994 |
| JP | 2009299210 | A | 12/2009 |
| WO | 2005003268 | A1 | 1/2005 |
| WO | 2012056252 | A2 | 5/2012 |
| WO | 2014037729 | A1 | 3/2014 |

\* cited by examiner

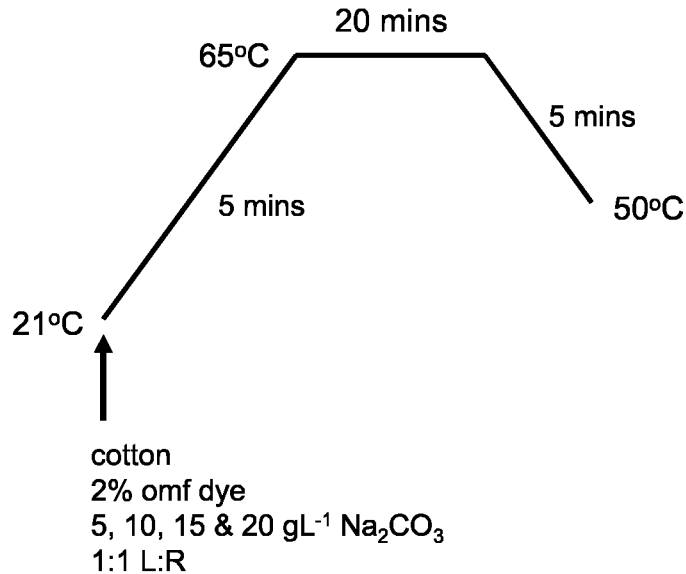
FIGURE 1   DYEING METHOD ACCORDING TO THE INVENTION
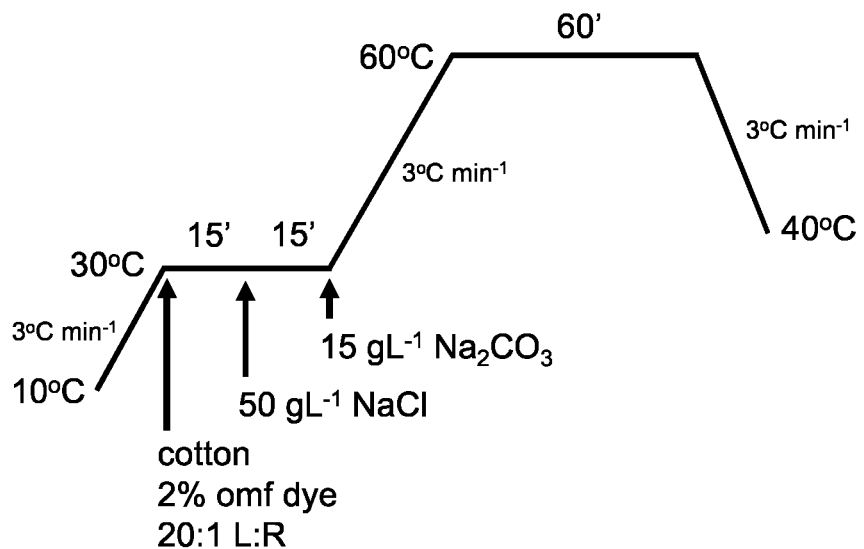
FIGURE 2   CONVENTIONAL DYEING METHOD

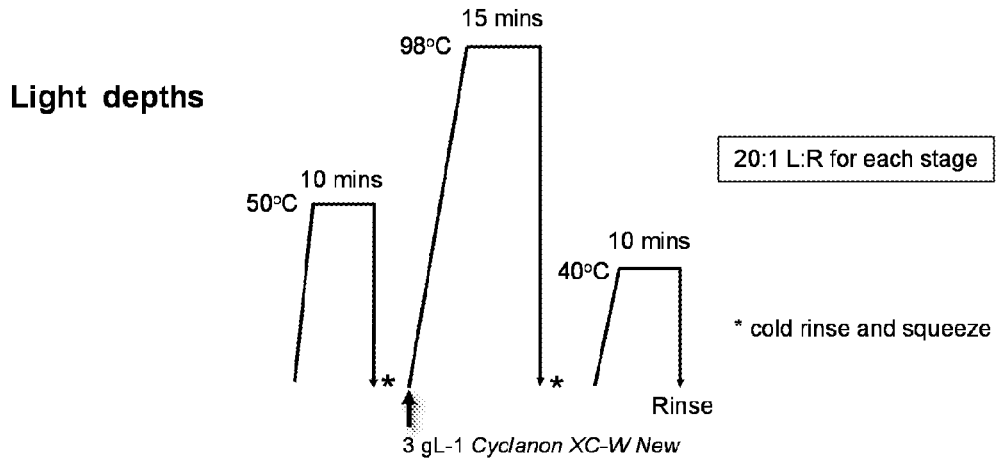
FIGURE 3    PRIOR ART WASH-OFF METHOD
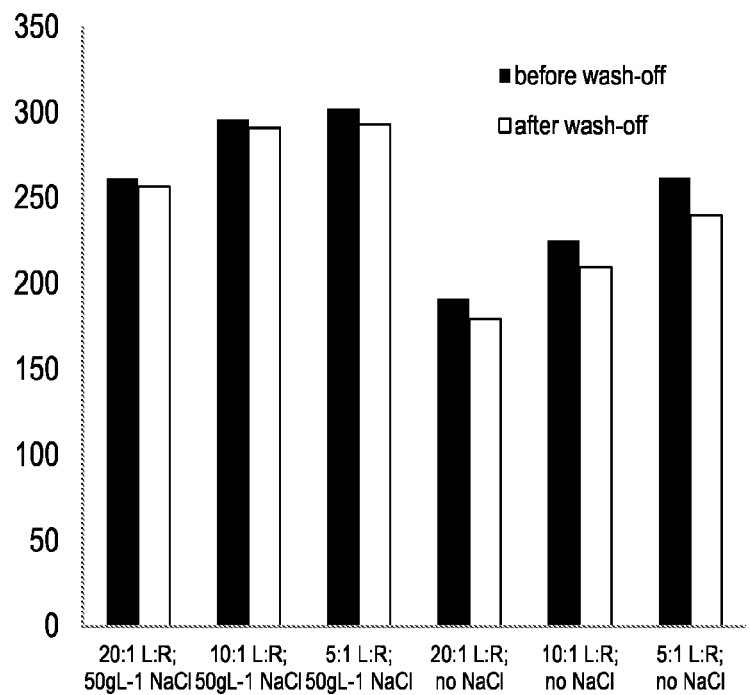
FIGURE 4    CONVENTIONAL DYEING WITH C.I. REACTIVE BLACK 5

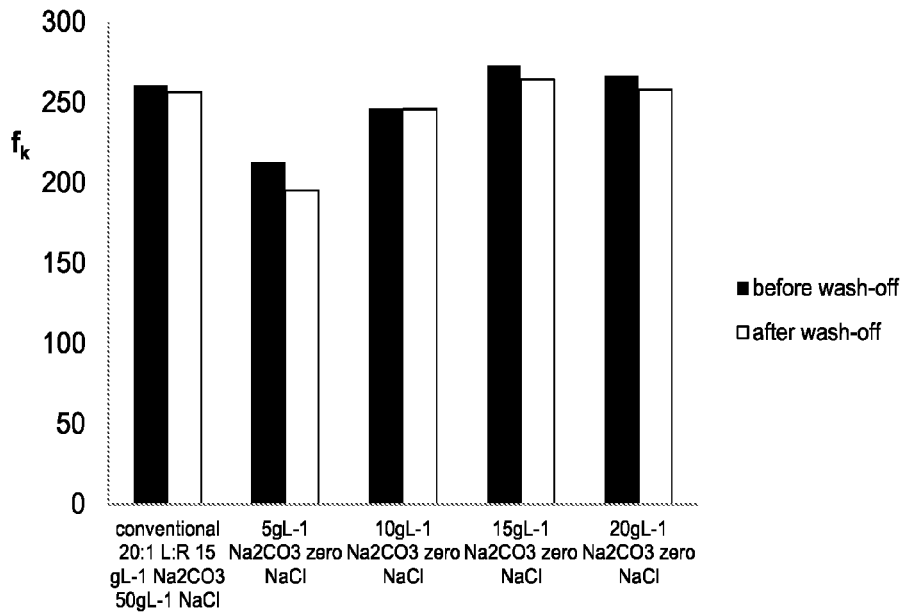
FIGURE 5  DYEING PER THE INVENTION WITH C.I. REACTIVE BLACK 5
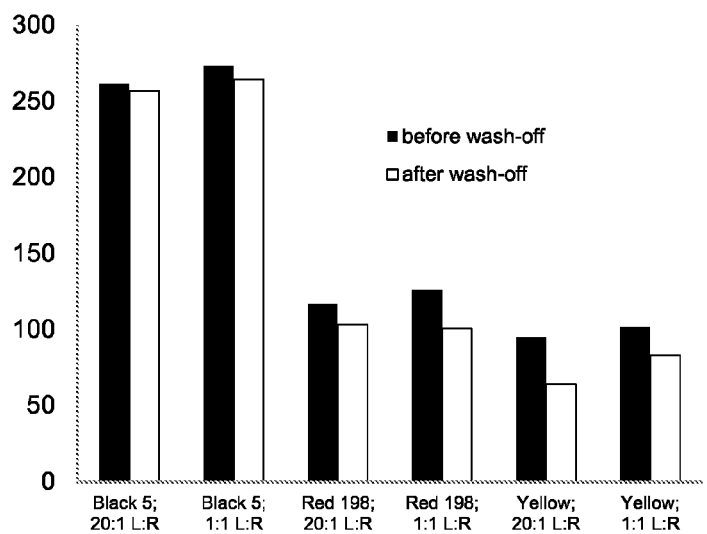
FIGURE 6  COMPARISON OF CONVENTIONAL DYEING AND DYEING PER THE INVENTION WITH C.I. REACTIVE BLACK 5, C.I. REACTIVE RED 198 and REMAZOL YELLOW R

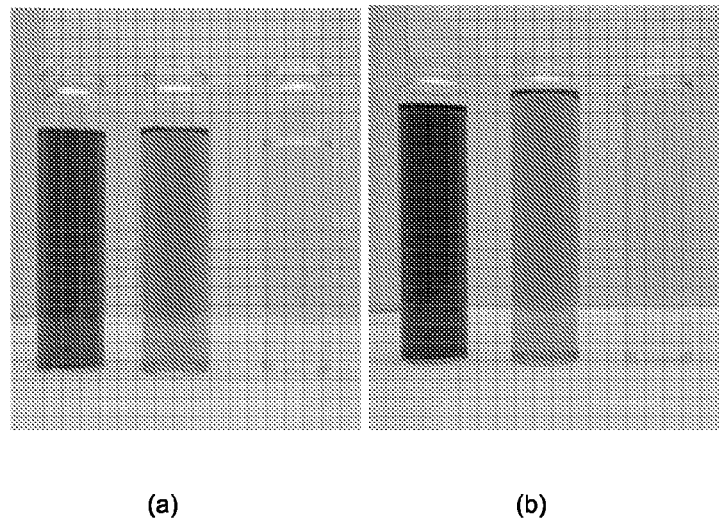
(a)           (b)
FIGURE 7    RESIDUAL LIQUORS OBTAINED FROM DYEINGS WITH C.I. REACTIVE BLACK 5 FOLLOWING CYCLANON® WASH OFF PROCESS
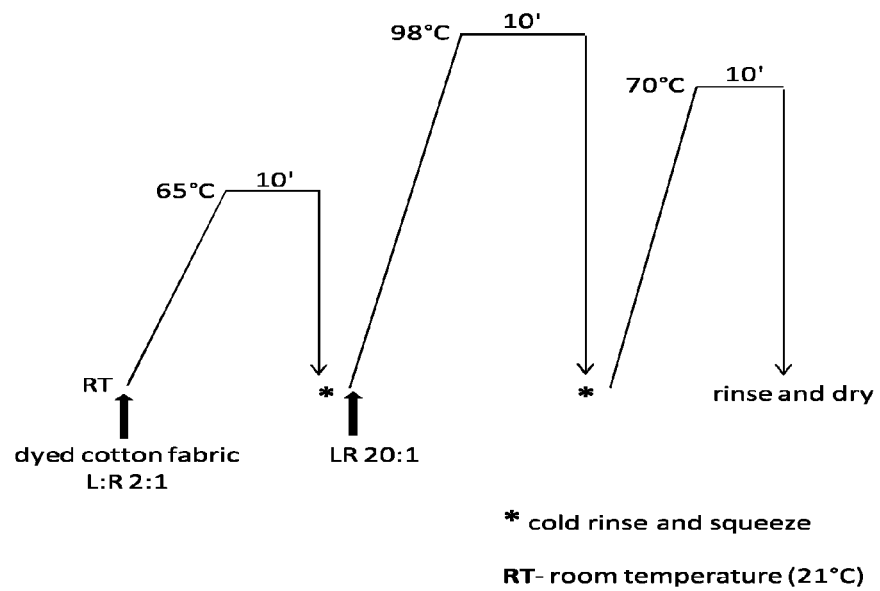
FIGURE 8    LOW LIQUOR/BOIL/RINSE WASH-OFF METHOD ACCORDING TO THE INVENTION

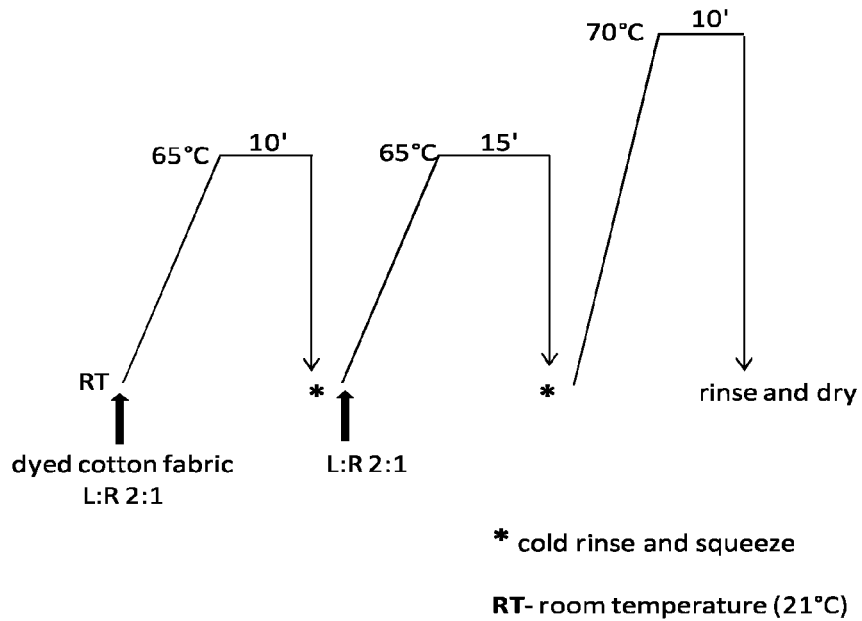
FIGURE 9 LOW LIQUOR/RINSE WASH-OFF METHOD ACCORDING TO THE INVENTION
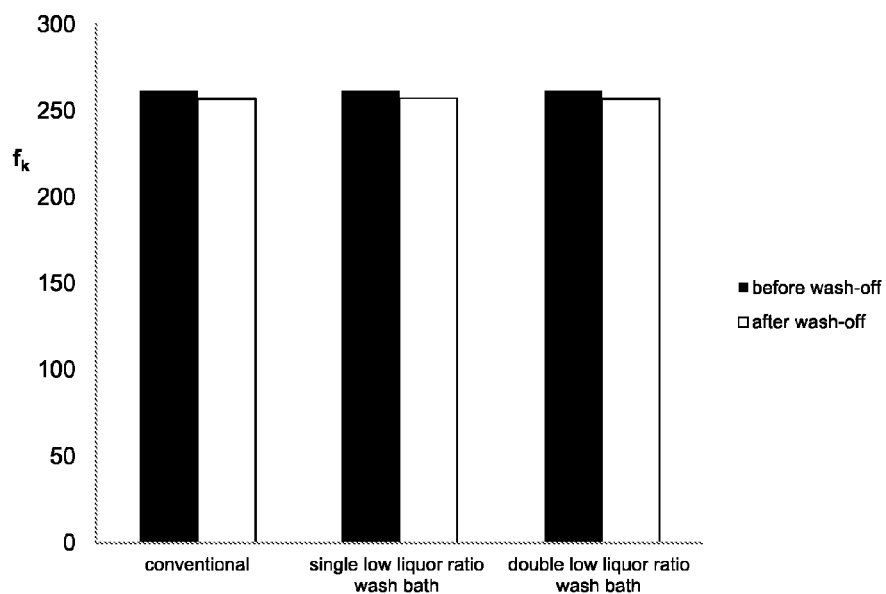
FIGURE 10 COLOUR STRENGTH OF 2% OMF C.I. REACTIVE BLACK 5 DYEINGS BEFORE AND AFTER WASH-OFF

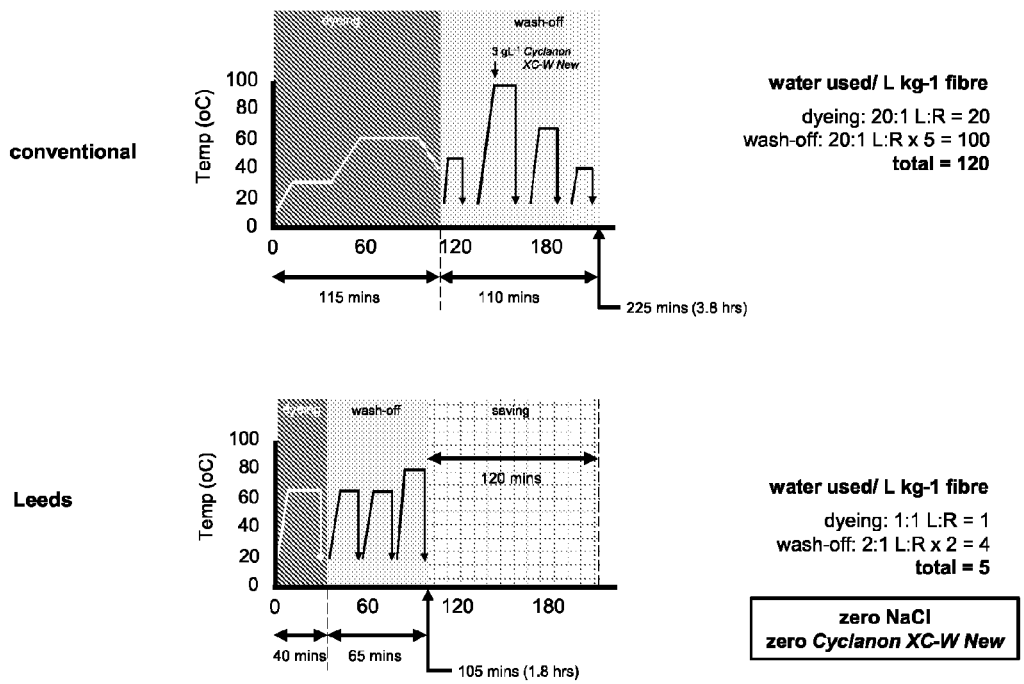
FIGURE 11  COMPARISON OF COMBINED TREATMENT AND WASH-OFF METHODS ACCORDING TO THE INVENTION WITH CONVENTIONAL DYEING AND WASH-OFF PROCESSES
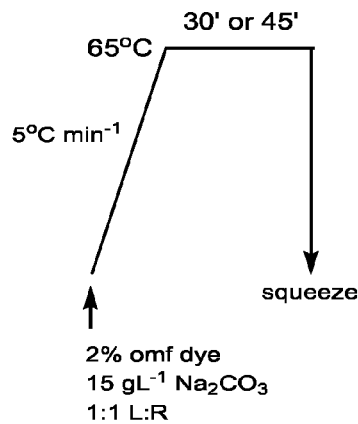
FIGURE 12  DYEING METHOD ACCORDING TO THE INVENTION

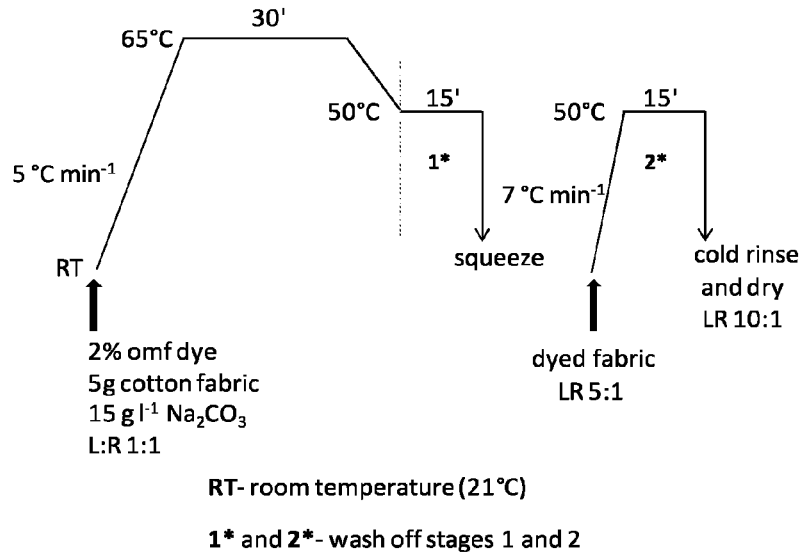
FIGURE 13  TWO-BATH WASH-OFF METHOD AT 50°C ACCORDING TO THE INVENTION
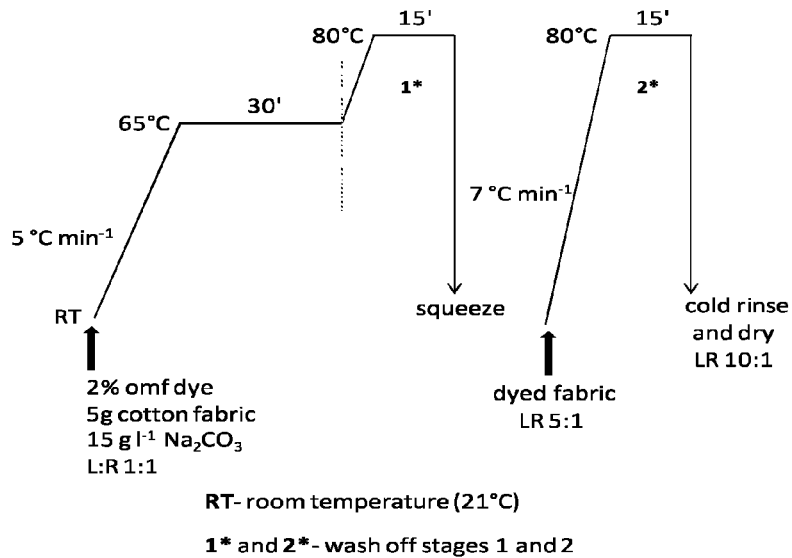
FIGURE 14  TWO-BATH WASH-OFF METHOD AT 80°C ACCORDING TO THE INVENTION

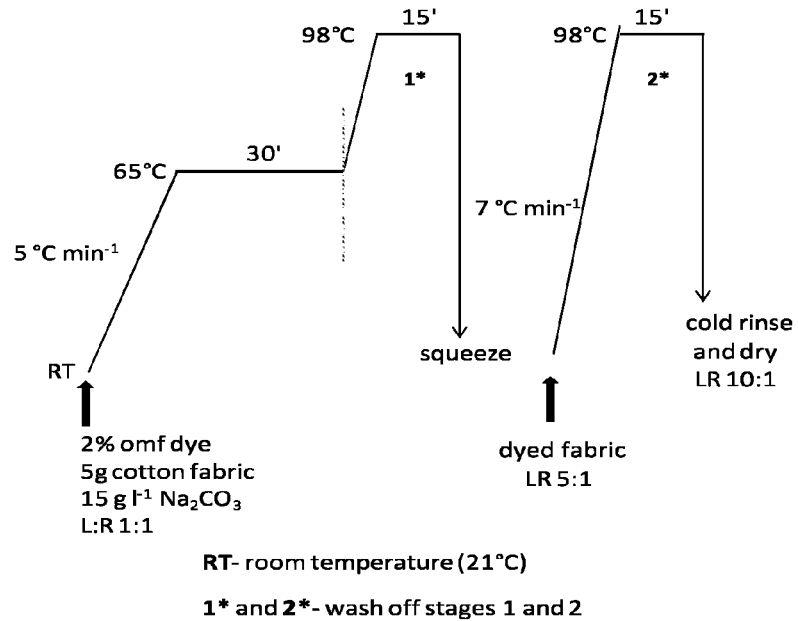
FIGURE 15  TWO-BATH WASH-OFF METHOD AT 98°C ACCORDING TO THE INVENTION
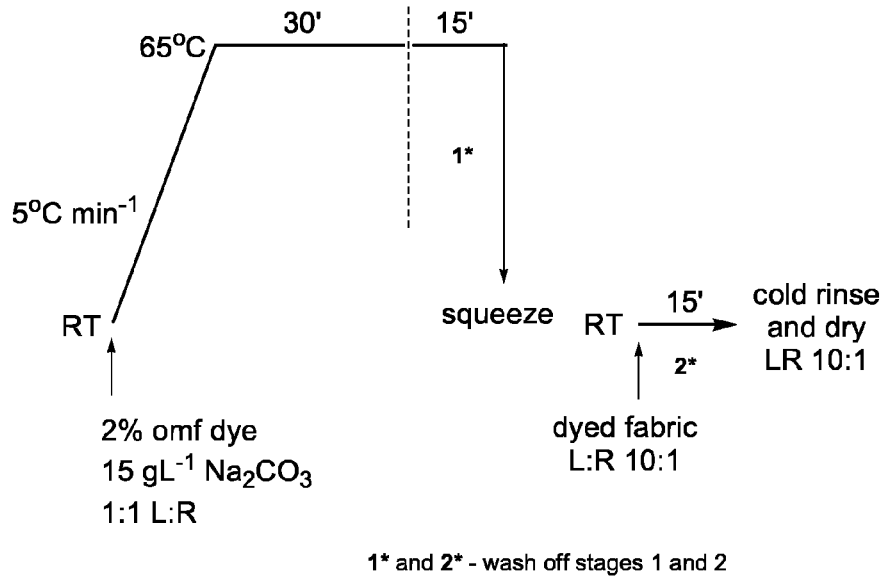
FIGURE 16  TWO-BATH WASH-OFF METHOD AT ROOM TEMPERATURE ACCORDING TO THE INVENTION

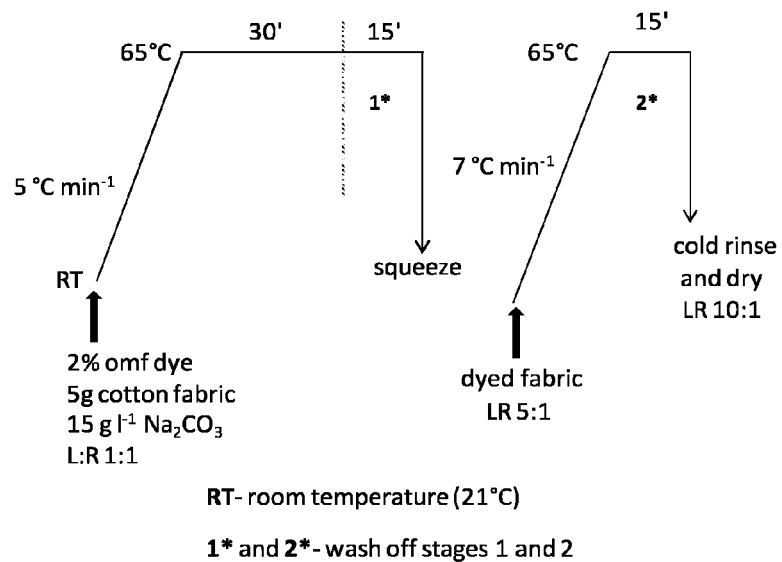
FIGURE 17 TWO-BATH WASH-OFF METHOD AT 65°C ACCORDING TO THE INVENTION
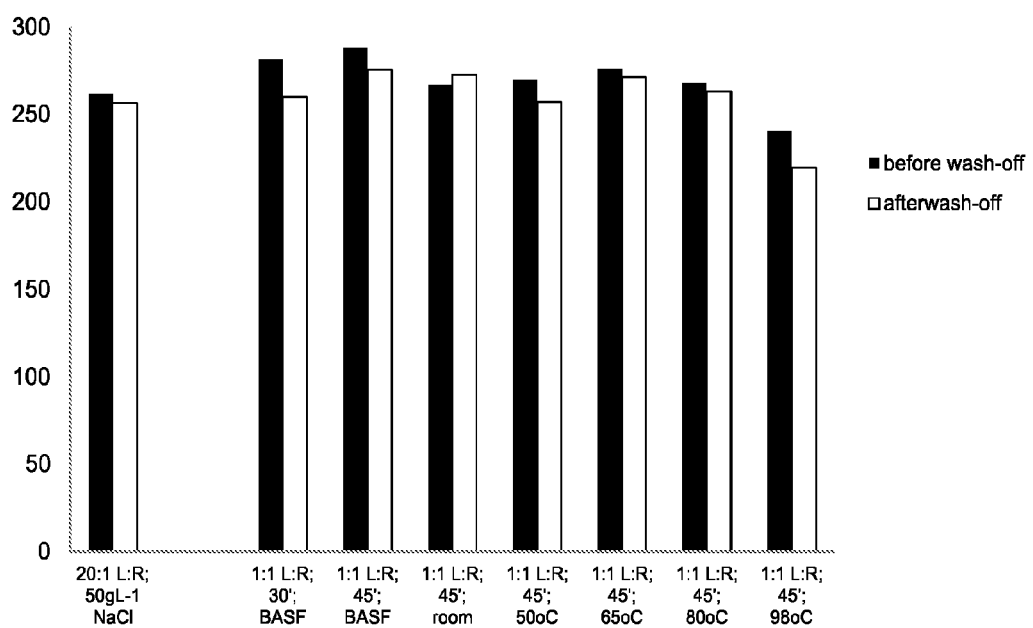
FIGURE 18 COLOUR STRENGTH OF CONVENTIONAL DYEINGS WITH C.I. REACTIVE BLACK 5

METHOD FOR COLORATION AND TREATMENT OF SUBSTRATES

CROSS REFERENCE TO RELATED APPLICATIONS

This application is a 35 U.S.C. § 371 U.S. national phase entry of International Application No. PCT/GB2014/050948 having an international filing date of Mar. 25, 2014, which claims the benefit of Great Britain Application No. 1305416.8 filed Mar. 25, 2013, each of which is incorporated herein by reference in its entirety.

FIELD OF THE INVENTION

This invention relates to a new process for the application of dyes and other treatments to substrates. More particularly, it provides a process for the application of various classes of dyes to textile fibres which allows for significant reductions in the duration and temperature of dyeing processes as well as the quantities of water and auxiliaries employed in such processes.

BACKGROUND TO THE INVENTION

Traditional dyeing processes of the type well known to those skilled in the art require the use of very large volumes of water. The bulk of the water present in these processes (>95%) is used for heating, rinsing, agitation, dissolution of chemicals and dye dispersion. This heavy usage of water naturally has significant environmental implications in view of the limited water resources which are available and the requirement to subsequently treat contaminated waste. Self-evidently, there are also substantial associated cost implications in terms of energy, water and process equipment.

As is well known in the coloration industry, there are vast numbers of processes available for the application of various classes of dyes to very many different fibre types. Typical dye classes include water soluble dyes such as acid dyes, basic dyes, direct dyes and reactive dyes, as well as sparingly water-soluble disperse dyes, and dyes which are solubilised during the dyeing process, for example vat dyes and sulphur dyes. All of these dyes are typically applied to textile fibres in the form of aqueous solutions or dispersions.

Amongst the fibre types coloured by such processes are included natural fibres, such as wool, cotton and silk, and man-made fibres as exemplified by cellulose acetate and lyocell, as well as synthetic fibres, for example polyesters, polyamides such as nylon, polyalkenes and polyacrylonitrile. Various blends of different fibre types, such as polyester/cotton, wool/nylon and polyester/viscose/cotton, are also coloured by such processes, often using processes which employ blends or mixtures of different classes or types of dye for each of the different fibre types present in the blended fibres.

Different conditions (pH, temperature, electrolyte; duration of treatment, liquor ratio, etc.) are currently used for the application of the various classes of dye to the different types of fibre. Amongst the commonest dyeing processes in this regard, there may be mentioned direct dyes on cotton, acid dyes on wool, reactive dyes on cotton and disperse dyes on polyester. This diversity of application method is both historical and necessary owing to the physical and chemical differences between the different fibres, and the different chemical natures of the various dyes. Consequently, markedly different conditions are required to apply the various classes of dyes to the various fibres.

Different finishes (e.g. water repellency, anti-crease, etc.) may also be applied to the dyed materials, again using different methods according to the nature of both the finish and type of fibre. Furthermore, different conditions are frequently required for the application of both dyes and finishes to the (chemically) same textile fibre depending on the particular physical form in which it is processed, including, for example, yarns, hanks, open width fabric, garment, etc.

Furthermore, various chemical pre-treatments are commonly required to prepare textile fibres for dyeing and chemical finishing. Thus, for example, scouring processes are often employed to clean the materials, especially in the case of natural fibres such as cotton and wool, whilst bleaching processes are used to reduce the yellowness of natural fibres, such as cotton, and to impart enhanced levels of whitenesss of the textile material.

As noted above, conventional dyeing methods consume vast volumes of water (typical liquor ratios being in the range of ~4-20:1 liquor ratio, depending on the type of fibre being treated); in addition, they employ huge quantities of dyeing auxiliaries such as electrolytes, surfactants, alkalis, acids and other such materials and, thereby, generate massive quantities of wastewater which, depending on factors such as the type of dye, depth of shade, fibre type and substrate construction being used, may contain residual dyes, electrolytes, acids, alkalis, and the like, and which can display marked recalcitrance towards biodegradation, thereby presenting both environmental and economic challenges. Indeed, many processes have been developed for the treatment and disposal of dye wastewater, including traditional wastewater treatment methods such as adsorption, electrochemistry and oxidation, as well as nanofiltration, photocatalysis, irradiation and biosorption.

A previous approach to addressing the problem of high levels of water consumption has been the application of supercritical carbon dioxide dyeing techniques, wherein $CO_2$ is heated to temperatures in the region of 120° C. and pressurised at around 20-30 MPa. These conditions cause the $CO_2$ to swell and penetrate the fibres, as well as dissolving the dyes, thereby causing dyeing to take place in ~60-120 minutes. However, such processes are high consumers of energy and use large volumes of $CO_2$. Furthermore, since the technology is suitable only for non-polar disperse dyes (because polar dyes are insoluble in liquid $CO_2$), it is of no value for the dyeing of wool, cotton, silk, etc., all of which require the use of polar dyes (e.g. the dyeing of cotton with reactive dyes). Such technology is currently under development by DyeCoo (http://www.dvecoo.com/).

An alternative strategy involves the use of ultrasound, which serves to increase dye dispersion and to degas dye solutions, thereby facilitating increased rates of dye diffusion inside textile fibres. Despite the achievement of encouraging results on a laboratory-scale during the last two decades, however, this technology has not yet proved to be attractive on a commercial scale.

A further approach has involved the development of various solvent dyeing techniques, wherein organic solvents are employed as replacements for water, or as co-solvents with water, in order to promote dyeing, especially of synthetic fibres with disperse dyes. This approach has been explored from the 1970s but, despite considerable research interest, the use of organic solvents in dyeing has not achieved commercial success, owing to the obvious concerns relating to the environment, in addition to the lack of economic and technical advantages which are associated with such an approach.

The present inventors have, therefore, sought to develop an approach that allows for significant reductions in the amount of water and dyeing auxiliaries, including various electrolytes, acids, alkalis and surfactants, which are used in the dyeing of substrates, especially textile fibres, and which also avoids the disadvantages associated with the various alternative approaches which have previously been explored. As a consequence, the inventors have succeeded in providing a process that has produced results which are comparable in quality (evenness and wash fastness) to conventional approaches, but which allow for the use of very significantly reduced amounts of water; indeed, water levels are typically reduced to ≤5-10% of the water levels used in conventional processes.

In developing this approach, the inventors have also addressed the issue of wash-off procedures for the treated substrates, most particularly dyed substrates, and have sought to provide wash-off procedures which also allow for the use of very significantly reduced amounts of water, since conventional wash-off procedures typically require the use of copious volumes of water and multiple procedural steps.

Thus, for example, a conventional wash-off process for a reactive dyed substrate would require the use of seven separate wash-baths. The Cyclanon® XC-W New process[4] developed by BASF seeks to reduce the number of stages and volumes of water required for the efficient wash-off of reactive dyeings on cotton but, in the case of monochlorotriazine reactive dyes in deep shades, for example, still necessitates the use of five separate baths to achieve satisfactory wash-off. This aspect of dyeing technology is further considered in WO-A-2010/007008, which relates to a process for the washing off of reactive-dyed textile material which comprises a first rinsing step, followed by a dwelling step, which is followed in turn by a second rinsing step. However, the present inventors have sought to still further enhance wash-off processes by providing a method which drastically reduces both the volumes of water and the number of procedural steps which are required.

SUMMARY OF THE INVENTION

Thus, according to a first aspect of the present invention, there is provided a method for the application of a treatment agent to a substrate, said method comprising the treatment of the substrate in an aqueous system comprising the solid particulate treatment agent in a closed container, said treatment being carried out at a ratio of liquor to substrate which does not exceed 2:1.

Optionally, said treatment may comprise the wetting out of the substrate using an aqueous liquor comprising said solid particulate treatment agent, said wetting out being carried out at a ratio of liquor to substrate which does not exceed 2:1.

Optionally, said treatment may comprise spraying either one or both sides of said substrate with an aqueous liquor comprising said solid particulate treatment agent so as to provide a ratio of liquor to substrate which does not exceed 2:1.

Optionally, said treatment may comprise the wetting out of the substrate with water and the subsequent treatment of the wetted out substrate with the solid particulate treatment agent.

In embodiments of the invention wherein the substrate is treated with an aqueous liquor comprising said solid particulate treatment agent, said treatment agent may be present in said aqueous liquor in partially or wholly dissolved form, or partially or wholly suspended or dispersed form.

In certain embodiments of the invention, said ratio of liquor to substrate is ≤1:1.

Said substrate may comprise any of a wide range of substrates, such as plastics materials, hair, rubber, paper, cardboard or wood. In typical embodiments of the invention, however, the substrate comprises a textile substrate, which may be a natural, man-made or synthetic textile substrate, or a substrate comprising a blend of natural, man-made and/or synthetic textile fibres. Natural textile substrates may, for example, include substrates comprising wool, cotton and/or silk. Typical man-made substrates are cellulose di- or triacetate, whilst synthetic textile substrates may comprise, for example, polyester, polyamide, polyalkene and/or polyacrylonitrile. A typical example of a natural/synthetic textile fibre blend would be a polyester/cotton substrate.

Suitable treatment agents may include any of a range of treatment agents. In the case of textile substrates, the method may be operated to successfully apply agents used for any textile application treatment, the agents including, for example, those utilised in processes such as scouring, mercerisation, bleaching and desizing, as well as finishing chemicals including, for example, water-repelling agents, anti-creasing agents (such as starches), anti-bacterial agents and fluorescent brightening agents. Suitable examples of solid bleaching agents may, for instance, include materials such as perborates (e.g. sodium perborate), peracids or peroxyacids (e.g. sodium percarbonate), or reagents such as sodium hydrosulphite and thiourea dioxide. In particularly favoured embodiments of the invention, however, said treatment agents comprise colorants, most particularly dyes.

Suitable dyes may include dyes which are water soluble or dyes which are sparingly soluble in water, or those which are water-insoluble. Typical examples of water soluble dyes include acid dyes, basic dyes, direct dyes and reactive dyes. Suitable sparingly soluble dyes are azoic colorants and disperse dyes, whilst water insoluble dyes are those which may be rendered soluble in water by, for example, chemical reduction, including, for example, vat dyes and sulphur dyes.

Said solid particulate treatment agent may comprise any suitable solid particulate form including, for example, pellets or powders. The treatment agent may be added to the treatment system at a wide range of agent:substrate ratios, but is typically added to the treatment system at a level in the region of 1-5% w/w of the substrate being treated, although greater or lesser amounts may be satisfactorily used. Thus, for example, satisfactory dyeings may be achieved with reactive dyes on cotton at levels of about 1.6% w/w.

Optionally, aqueous systems comprising said at least one solid particulate treatment agent comprise at least one additional assisting agent. Most typically, systems comprising solid particulate dyes comprise at least one additional assisting agent to facilitate increased dyeing efficiency. Such assisting agents would be those which would be appropriate to a particular dye/fibre combination, the nature of which would be apparent to a skilled person.

Thus, for example, the dyeing of a cellulose substrate with a reactive dye would most typically be carried out in the presence of an alkaline material, whilst the application of a vat dye would require the initial presence of alkaline and reducing agents, and the subsequent application of oxidising agents, whilst the application of acid dyes would necessitate the addition of an acid. A further example of an additional assisting agent may comprise a surfactant, which may be applicable to any treatment process according to the method in order to aid wetting-out of the substrate, especially when this comprises a textile material.

Said at least one additional assisting agent is also provided as a solid particulate material, and may optionally be provided as a separate particulate material or, more conveniently, the treatment may be carried out with a composite particulate material comprising a mixture of agents, e.g. a dye and a dyeing assistant, such as an alkaline material. Optionally, said at least one additional agent may be provided as an aqueous liquor. Most conveniently, in embodiments of the invention wherein an aqueous liquor comprising said solid particulate treatment agent is applied to a substrate by means of wetting out or spraying procedures, said assisting agent is also provided as an aqueous liquor; typically, said assisting agent is comprised in the aqueous liquor comprising the treatment agent, but it may be comprised in a separate aqueous liquor.

In embodiments of the invention wherein the substrate is treated with an aqueous liquor comprising said solid particulate treatment agent and said assisting agent, said assisting agent may be present in said aqueous liquor in partially or wholly dissolved or suspended form The additional assisting agent is added at a level appropriate to the treatment process which is being performed. Thus, for example, surfactants may be added at a level in the region of 0.5-10.0 $gL^{-1}$, most typically in the region of 1 $gL^{-1}$, whilst alkaline agents are included in systems for the reactive dyeing of cotton in amounts of 1-20 $gL^{-1}$, with particularly good results being observed at addition levels of around 15 $gL^{-1}$.

Although the use of additional assisting agents is frequently beneficial in procedures according to the invention, most typically in dyeing procedures according to the invention, the disclosed method does, however, provide another significant advantage over the conventional aqueous dyeing procedures of the prior art, in that the method described herein is carried out in the absence of added dye uptake-promoting additives which increase dye uptake by controlling physical parameters, most particularly electrical interactions between treatment agents—especially dyes—and substrates, or at least in the presence of significantly reduced amounts of these materials.

Such electrical interactions are particularly significant in the case of water soluble dyes which carry electrical charges in solution—for example direct dyes, acid dyes, basic dyes, vat dyes, sulphur dyes and reactive dyes. However, further examples of dye uptake-promoting additives include dispersing agents, which are used in the dyeing of hydrophobic fibres, such as polyester, using disperse dyes. The dispersing agents are included in the dyebath in order to promote formation of a uniform dispersion and to stabilise the dispersion by prevention agglomeration, thereby providing enhanced dye-fibre interactions and increased dye uptake.

Thus, it is typically the case with conventional dyeing procedures involving the use of water soluble dyes, such as anionic, direct or reactive dyes, when dyeing cellulosic fibres, as exemplified by cotton, viscose or lyocell fibres, that the addition of significant quantities of electrolyte to the dyebath is required in order to facilitate efficient dyeing, thereby creating additional cost and environmental issues; however, these disadvantages may be avoided when employing the method of the present invention, which allows for the production of high quality dyeings in the absence of added electrolyte. Suitable electrolytes are typically selected from pH-neutral salts, and examples of salts which are typically utilised in this context include, for example, sodium chloride and sodium sulphate, and are believed to control electrical interactions in such dyebaths by reducing charge repulsion between dye and fibre.

The addition of significant quantities of electrolyte is also advantageous in the performance of conventional dyeing procedures with vat dyes in their reduced, leuco form, for which water solubility and anionicity is provided by the presence of ionised carbonyl groups (i.e. $-CO^-$). C.I. Coupling Components can also carry a charge through ionisation of the $-OH$ group (i.e. $-RO^-$) on the reasonably planar naphthalene ring to impart solubility and anionicity, whilst anionicity and water solubility probably also arise from the presence of ionised thiol groups ($-S^-$) in the cases of both C.I. Sulphur Dyes and C.I. Leuco Sulphur Dyes, or thiosulphuric acid groups ($-OSO_3^-$) in the case of C.I. Solubilised Sulphur Dyes. In each of these cases, electrolytes are commonly added to the dyebath in order to promote dye uptake.

In the case of dyeings on wool, silk and nylon, typically involving the use of acid dyes or reactive dyes, conventional procedures envisage the addition of acids such as sulphuric acid, buffering agents (e.g. acetic acid/sodium acetate), or acid donor agents such as ethyl lactate in order to adjust/control the pH of the dyeing system so as to control electrical interactions between dyes and substrate which are believed to provide enhanced interactions between anionic dyes and protonated fibres. Again, however, the use of the method of the present invention allows for the dyeing processes to be carried out in the absence of such added acids and/or buffers and/or acid donor agents as dye uptake-promoting additives, or at least in the presence of significantly reduced amounts of these materials.

When considering the application of disperse dyes to hydrophobic fibres such as polyester, conventional dyeing procedures would envisage the use of dispersing agents. Dispersing agents also are added to vat dyebaths to counter aggregation, as well as being used to safeguard the stability of the naphtholate in the application of azoic colorants. The use of the method of the present invention, however, again allows for the dyeing processes to be carried out in the absence, or at least in the presence of significantly reduced amounts of, such added dispersing agents.

The first aspect of the present invention thereby provides a method for the application of a treatment agent to a substrate wherein said method is carried out in the absence of additional additives—typically electrolytes, acids, buffering agents, acid donor agents or dispersing agents—which would, in conventional dyeing procedures, be added for the sole purpose of increasing dye uptake by regulating electrical interactions between the substrate and the treatment agent or otherwise enhancing dye-fibre interactions. Common examples of the electrolytes are the halide or sulphate salts of alkali metals, such as sodium chloride, lithium chloride, potassium chloride, caesium chloride and sodium sulphate. Examples of acids include sulphuric acid, acetic acid and formic acid, whilst buffering agents may, inter alia, be selected from materials such as acetic acid/sodium acetate, sodium dihydrogen orthophosphate/disodium hydrogen orthophosphate, and examples of acid donor agents may include diethyl lactone, ethyl lactate and γ-butyrolactone. Common dispersing agents may include protein condensates, polyphosphates, lignin sulfonates and formaldehyde polycondensates of arylsulfonic acids.

Further examples of electrolytes, specifically for use in the dyeing of cellulosic fibres with anionic dyes, include organic salts such as the salts of various mono-, di-, and/or tri-carboxylic acids, including trisodium citrate or sodium ethylenediamine tetraacetate, as well as compounds such as betaines, for example, N,N,N-trimethylglycine, in addition to certain cationic or amphoteric compounds. The further addition of all such electrolytes, which are essentially salts which provide reduced charge repulsion between dye and substrate, is obviated by the use of the method of the present invention. Thus, any additional assisting agents which are employed would not include such electrolytes.

The method of the first aspect of the invention is typically carried out at ambient or elevated temperature which may suitably fall in the rage of from 20 to 140° C. Particularly favourable results have been achieved using temperatures in the region of 50-65° C.

Particularly advantageous results are achieved when employing processes according to the invention which are carried out at liquor to substrate ratios of ≤1:1.

Said treatment method is carried out in a closed container which may include, for example, a sealed dyepot or other suitable sealable dyeing or fabric treatment apparatus. The container may be formed from any suitable material but, most conveniently, it comprises a metal (e.g. stainless steel) or plastic (e.g. polypropylene) container. The use of a closed system in this way allows for the generation of a low pressure water vapour environment when the temperature of the system is elevated above the ambient. Without wishing to be bound by theory, the inventors believe that the water vapour produced in this way further dampens and swells the substrate, and is particularly effective in so doing in the case of textile fibres; the environment which is created also promotes dissolution of the solid particulate treatment agent (e.g. dye), and any additional agents (e.g. alkali), thereby facilitating the efficient treatment of the substrate in the absence of bulk process-water. It is considered that the water vapour environment aids diffusion of the solid particulate treatment agent (e.g. dye), and any additional assisting agents (e.g. alkali) within the textile material and also promotes uniform sorption of the solid particulate treatment agent (e.g. dye) and any additional assisting agents (e.g. alkali) across the substrate.

Advantageously, the aqueous system containing the substrate is agitated, typically in a random manner, during the performance of the method of the invention. Typically, treatments according to the method of the invention are carried out for a duration of between 10 to 45 minutes, with favourable results generally being achieved in 30 minutes or less.

According to a second aspect of the present invention, there is provided a method for the removal of surplus treatment agents following application of said treatment agents to a substrate, said method comprising not more than three wash-off treatments of said substrate with water following said application.

In certain embodiments of the method according to the second aspect of the invention, said method comprises a three-stage process comprising performing, in order, the steps of:
(a) A first wash-off of the treated substrate with water in a closed container at a ratio of water to substrate which does not exceed 2:1;
(b) A second wash-off of the treated substrate with water in a closed container at a ratio of water to substrate which does not exceed 2:1; and
(c) A final wash-off of the treated substrate with water in a closed container at a ratio of water to substrate which does not exceed 20:1.

According to said embodiments, the final wash-off of the treated substrate with water in a closed container is generally carried out at a ratio of water to substrate which is in the region of 5-10:1.

Typically, the first and second wash-off steps are carried out at ambient temperature (15-25° C.), whilst the final wash-off step is performed at a temperature of 40-80° C., most particularly at around 70° C. The duration of each wash-off step is typically in the region of from 10-15 minutes. Alternatively, the final wash-off step may also be performed at ambient temperature (15-25° C.) for a longer duration of 15-45 minutes.

In said embodiments, the substrate is typically rinsed with tap water at ambient temperature after each wash-off step, before being finally allowed to dry.

In alternative embodiments of the method according to the second aspect of the invention, said method comprises a two-stage process comprising performing, in order, the steps of:
(a) A first wash-off of the treated substrate with water in a closed container at a ratio of water to substrate which does not exceed 5:1; and
(b) A second wash-off of the treated substrate with water in a closed container at a ratio of water to substrate which does not exceed 10:1.

Typically, in said embodiments of the invention, the first wash-off step is carried out at temperatures between the ambient (15-25° C.) and 98° C., whilst the second wash-off step is performed at ambient temperature of (15-25° C.). The duration of the first wash-off step is typically in the region of 15 minutes, whilst the second wash-off step is generally performed for a shorter duration of around 3 minutes.

In said embodiments, rinsing of the substrate with tap water at ambient temperature after each wash-off step is generally not necessary, and the substrate can simply be allowed to dry after the second wash-off step.

The method of the second aspect of the invention may be applied to the wash-off treatment of a wide range of substrates, such as plastics materials, hair, rubber, paper, cardboard or wood, which may have been subjected to various treatments. The method is, however, most typically applied to the wash-off of textile substrates following any of a wide range of textile treatments, such as scouring, mercerisation, bleaching and desizing, as well as various finishing treatments and is particularly suited to the washing-off of substrates wherein the treatments agents are dyes, i.e. in the washing-off of dyed substrates. The method of the second aspect of the invention is most successfully applied to the washing-off of substrates which have been dyed according to the method according to the first aspect of the invention.

It is also frequently the case that the use of the method of the second aspect of the invention allows for the use of surfactants and other auxiliary agents in wash-off procedures to be avoided. Thus, at the conclusion of conventional dyeing and printing processes, all dyeings and prints are subjected to an aqueous treatment to remove surplus dye and dyeing/printing auxiliaries, such as levelling agents, electrolytes, etc. The simplest form of this aqueous treatment comprises a single rinse with water but, since such a rinse frequently fails to remove all surplus dye and dyeing auxiliaries, the treatment generally requires several rinses using combinations of cold, warm and hot water. Such conventional multi-stage, aqueous wash-off processes also commonly include the use of chemicals (e.g. acids and alkalis) as well as specific auxiliary agents (such as surfactants and oxidants) to expedite complete removal of dye and dyeing auxiliaries and also to ensure that optimum colour, depth of shade, fastness, etc. are achieved.

Although the particular conditions employed for wash-off processes depend on various factors—such as type of dye used, depth of shade, fibre type, substrate construction and the like—the wash-off methods used for all dye/fibre systems routinely employ large liquor ratios (i.e. commonly 8-20:1), often also requiring the use of additional rinsing stages which consume large volumes of water. Hence, conventional wash-off processes generate large volumes of wastewater that typically contain residual dyes, surfactants, electrolytes, etc., all of which characteristically display marked recalcitrance towards biodegradation, thereby presenting both environmental and economic challenges. By way of contrast, the method of the second aspect of the invention frequently allows for the use of additional auxiliary agents to be avoided, most particularly when applied to the washing-off of substrates which have been dyed according to the method according to the first aspect of the invention.

It will be appreciated, therefore, that the temperature and time of the treatment methods according to the present invention are both significantly lower than for prior art methods, providing yet further benefits in terms of environmental and cost considerations, whilst the frequent avoidance of the requirement for the use of auxiliary treatment agents during wash-off procedures offers additional advantages in this regard.

The methods of the present invention may be used for either small or large scale processes which may be batchwise, continuous or semi-continuous processes.

BRIEF DESCRIPTION OF THE DRAWINGS

Embodiments of the invention are further described hereinafter with reference to the accompanying drawings, in which:

FIG. 1 is a method profile for the application of C.I. Reactive Black 5 to cotton according to an embodiment of the method of the invention;

FIG. 2 is a method profile for the application of C.I. Reactive Black 5 to cotton according to a method of the prior art;

FIG. 3 is a method profile for a prior art wash off procedure employed following the applications of C.I. Reactive Black 5 to cotton using the methods illustrated in FIGS. 1 and 2;

FIG. 4 illustrates the colour strength profiles observed before and after the wash-off procedure of FIG. 3 following the application of C.I. Reactive Black 5 to cotton according to the method of the prior art shown in FIG. 2;

FIG. 5 illustrates the colour strength profiles observed before and after the wash-off procedure of FIG. 3 following the application of C.I. Reactive Black 5 to cotton according to the embodiment of the method of the invention shown in FIG. 1;

FIG. 6 shows a comparison of the colour strength profiles observed before and after the wash-off procedure of FIG. 3 following the application of C.I. Reactive Black 5, C.I. Reactive Red 198 and Remazol Yellow R to cotton according to methods of the prior art and of an embodiment of the invention;

FIG. 7(a) shows images of the residual liquors obtained from each of the wash-off stages of the prior art wash-off procedure of FIG. 3 following the application of C.I. Reactive Black 5 to cotton according to the method of the prior art;

FIG. 7(b) shows images of the residual liquors obtained from each of the wash-off stages of the prior art wash-off procedure of FIG. 3 following the application of C.I. Reactive Black 5 to cotton according to an embodiment of the method of the invention;

FIG. 8 is a method profile for a wash off procedure according to an embodiment of the present invention employed following the applications of C.I. Reactive Black 5 to cotton according to the method of the prior art shown in FIG. 2;

FIG. 9 is a method profile for a further wash off procedure according to a further embodiment of the present invention employed following the applications of C.I. Reactive Black 5 to cotton according to the method of the prior art shown in FIG. 2;

FIG. 10 illustrates the colour strength profiles observed before and after the wash-off procedures of FIGS. 3, 8 and 9 following the application of C.I. Reactive Black 5 to cotton according to the method of the prior art shown in FIG. 2;

FIG. 11 provides a comparison of combined substrate treatment and wash-off procedures according to methods of the prior art and of an embodiment of the present invention;

FIG. 12 is a method profile for the application of C.I. Reactive Black 5 to cotton according to a further embodiment of the method of the invention;

FIG. 13 is a method profile for a two-bath wash off procedure according to an embodiment of the present invention employed following the applications of C.I. Reactive Black 5 to cotton according to the embodiment of the method of the invention shown in FIG. 12;

FIG. 14 is a method profile for an alternative two-bath wash off procedure according to a further embodiment of the present invention employed following the applications of C.I. Reactive Black 5 to cotton according to the embodiment of the method of the invention shown in FIG. 12;

FIG. 15 is a method profile for a further alternative two-bath wash off procedure according to another embodiment of the present invention employed following the applications of C.I. Reactive Black 5 to cotton according to the embodiment of the method of the invention shown in FIG. 12;

FIG. 16 is a method profile for another alternative two-bath wash off procedure according to a still further embodiment of the present invention employed following the applications of C.I. Reactive Black 5 to cotton according to the embodiment of the method of the invention shown in FIG. 12;

FIG. 17 is a method profile for a still further alternative two-bath wash off procedure according to yet another embodiment of the present invention employed following the applications of C.I. Reactive Black 5 to cotton according to the embodiment of the method of the invention shown in FIG. 12; and FIG. 18 provides an illustration of colour strength profiles observed before and after the prior art wash-off procedure of FIG. 3 following the application of C.I. Reactive Black 5 to cotton according to methods of the prior art.

DESCRIPTION OF THE INVENTION

Specific embodiments of the first aspect of the present invention involve the wetting out of textile materials with water so as to achieve a substrate to liquor ratio of ≤1:1. The wetted textile material is then placed in a container together with a dye (in powder, pelletised or other dry form, such as grains, granules, and the like) and, if appropriate, at least one additional assisting agent—for example an alkaline material in the case of reactive dyes and cellulosic materials. The container should be of suitable ullage so as to enable an adequate level of movement of the damp textile material and dyes (and optional other agents), and also to facilitate the development of a water vapour environment within the sealed container. The sealed container is then agitated in a suitable machine at the appropriate temperature until dyeing is achieved, which typically would take around 30 minutes.

In other embodiments of the first aspect of the present invention, non wetted-out textile materials may be treated by either spraying or immersing the substrate with an aqueous solution which comprises the at least one treatment agent dye and, if appropriate, at least one additional assisting agent. The amount of the aqueous solution applied to the textile substrate is typically such as to achieve a substrate to liquor ratio of about 1:1. The treated textile material is typically placed in a container which is then sealed. The container is of appropriate ullage to enable an adequate level of movement of the damp, treated substrate and the development of a water vapour environment within the sealed container. The sealed container is then agitated in a suitable machine at the appropriate temperature until dyeing is achieved, which typically would take around 30 minutes.

Thus, it is seen that the disclosed process is extremely simple and efficient. As previously observed, it may be applied to the application of finishes to textile materials, as well as for the dyeing of these materials. Hence, the invention facilitates the application of dyes and finishes, by an exhaust method, to all types of textile fibres in a wide range of physical forms at a liquor ratio of ≤1:1 (or, optionally, higher) without the requirement for inclusion of significant quantities of additional agents as dyeing assistants. Indeed, pH adjustment of the dyebath is not always necessary for any dye types other than those wherein a chemical reaction of the dye occurs—i.e. reactive dyes and vat dyes when applied to cellulosic fibres—and, even in such applications, the amounts of additional agents employed are significantly lower than with the methods of the prior art. Thus, for example, in the case of reactive dyes on cellulosic fibres, wherein the addition of an amount of alkali is necessary, this amount is approximately 30% of that which is used in conventional aqueous exhaust dyeing.

On completion of treatments according to the method of the first aspect of the invention, the treated substrate may be washed-off/rinsed using conventional methods well known in the art. However, in view of the fact that water usage levels according to the method of the invention are so low, it is found that, unlike conventionally treated materials, those treated by the disclosed method do not require hydro-extraction (e.g. by spinning, centrifuging or the like) prior to further processing.

In view of the fact that the levels of additional agents and additives employed in the method of the first aspect of the invention are low as a consequence of the reduced level or complete absence of certain additional electrolytes, acids, buffering agents, acid donor agents and dispersing agents, it is found that—unlike conventionally treated materials—those materials treated by the disclosed method, particularly in the context of dye application to textile materials, do not require stringent or prolonged wash-off processes to remove surplus dyes and such added assisting agents which are present subsequent to dyeing. Thus, in certain embodiments of the invention, the treated substrate may be washed-off using the method according to the second aspect of the present invention, said method comprising not more than three wash-off treatments of said substrate with water following said application.

In certain embodiments of the method according to the second aspect of the invention, said method comprises a three-stage process comprising performing, in order, the steps of:
(a) A first wash-off of the treated substrate with water in a closed container at a ratio of water to substrate which does not exceed 2:1;
(b) A second wash-off of the treated substrate with water in a closed container at a ratio of water to substrate which does not exceed 2:1; and
(c) A final wash-off of the treated substrate with water in a closed container at a ratio of water to substrate which does not exceed 20:1.

Particularly favourable results are achieved with said embodiments when the steps (a) and (b) are carried out at a L:R of 2:1 and the L:R in step (c) is 5-10:1.

The first and second wash-off steps are typically carried out at ambient temperature (15-25° C.), whilst the final wash-off step is performed at a temperature of 40-80° C., most particularly at around 70° C. The duration of each wash-off step is typically in the region of from 10-15 minutes, although the final wash-off step may alternatively also be performed at ambient temperature (15-25° C.) for a longer duration of 15-45 minutes. The substrate is generally rinsed with tap water at ambient temperature after each wash-off step, before being finally allowed to dry.

In alternative embodiments of the method according to the second aspect of the invention, said method comprises a two-stage process comprising performing, in order, the steps of:
(a) A first wash-off of the treated substrate with water in a closed container at a ratio of water to substrate which does not exceed 5:1; and
(b) A second wash-off of the treated substrate with water in a closed container at a ratio of water to substrate which does not exceed 10:1.

In said embodiments, the first wash-off step is typically carried out at temperatures between the ambient (15-25° C.) and 98° C., whilst the second wash-off step is performed at ambient temperature of 15-25° C. The duration of the first wash-off step is typically in the region of 15 minutes, whilst the second wash-off step is generally performed for a shorter duration of around 3 minutes. Rinsing of the substrate with tap water at ambient temperature after each wash-off step is generally not necessary, and the substrate can simply be allowed to dry after the second wash-off step.

In particularly favoured embodiments of the second aspect of the invention, one or more of the wash-off processes may be performed in the absence of added auxiliary treatment agents, such as surfactants.

This method is particularly suited to the washing-off of substrates wherein the treatments agents are dyes, i.e. in the washing-off of dyed substrates, especially when the dyes have been applied using the method according to the first aspect of the invention.

Whilst the solid particulate treatment agent used in the method of the invention may be in any suitable form, it is frequently found that advantageous results are associated with the use of pelletised materials. Most particularly, the inventors have employed pelletisation to provide pellets of alkali and dye as well as alkali/dye admixture. Such an approach has been shown to facilitate the controlled release of both dye and alkali during dyeing procedures.

In alternative embodiments of the invention wherein non wetted-out textile materials are treated by either spraying or immersing the substrate with an aqueous solution which comprises at least one solid particulate treatment agent and, if appropriate, at least one additional assisting agent, the textile substrate is treated with an aqueous liquor comprising said solid particulate treatment agent and said optional at least one assisting agent, wherein said treatment agent and said assisting agent may be present in said aqueous liquor in partially or wholly dissolved or suspended form.

As previously suggested, the present inventors attribute the success of the presently claimed method to the provision of saturated water vapour and an appropriate saturated water vapour pressure within the container, together with an appropriate level of physical interaction between dye and wetted substrate—typically textile—material, which facilitates efficient dyeing and finishing according to the method of the invention, even at the very low ($\leq 1:1$) liquor ratios and relatively short treatment times which are employed.

Mechanistically, in the case of the application of solid particulate materials (e.g. treatment agents such as dyes, and additional assisting agents such as dyebath assistants), it is important that the textile material should be moistened (i.e. wetted-out) in order for success to be achieved; in this regard, the addition of surfactant to the water used for wetting-out promotes wetting-out and aids dye/finisher-fibre interchange, thereby promoting uniform application of the treatment agent, which is particularly important in the case of dyeing procedures. However, it should be stressed that the method of the invention may still be successfully performed in the absence of surfactant.

As previously noted, in performing the method of the invention, the wetted substrate may be added to the container together with the solid particulate treatment agent and any additional solid particulate treatment agent and/or additional assisting agent; alternatively, these agents may be included in the wetting out process, so that the substrate is wetted-out (at a typical liquor ratio of $\leq 1:1$) using water which contains dye and/or finisher and optionally other agents, or may be sprayed onto the substrate.

The success of the claimed method in achieving excellent results in dyeing and finishing processes without the requirement for the use of high temperatures can be attributed to the fact that, even at comparatively low temperatures (i.e. 50-65° C., compared to conventionally used temperatures of around 98° C.), sufficient water vapour and water vapour pressure are generated within the sealed container, thereby facilitating the dissolution of the dye and/or finisher and its uniform absorption by the substrate. Specifically, in the case of the application of reactive dyes to textile substrates, it is observed that the use of lower levels of water and lower temperatures results in a lower level of reactive dye hydrolysis when compared to conventional exhaust dyeing.

It is believed that the success of the method according to the second aspect of the invention is also attributable to the generation, even at low and comparatively low temperatures (i.e. room temperature and temperatures of around 70° C., rather than boiling point) of sufficient water vapour and water vapour pressure within the sealed container to facilitate the dissolution of surplus dye on the substrate in the wash-off water.

The claimed invention will now be further illustrated, though without in any way limiting the scope of the disclosure, by reference to the following examples.

EXAMPLES

The following examples of the method of the first aspect of the invention relate particularly to the application of reactive dyes to cotton, although the method of the invention is equally applicable to other substrate treatments, and especially to all dye-fibre systems, and further examples are provided of the application of metallised and non-metallised acid dyes on wool, nylon and silk, direct dyes on cotton and disperse dyes on polyester.

Standard pelletisation procedures were used to obtain suitable pellets of alkali and dye, as well as alkali/dye admixture. This facilitated the controlled release of both dye and alkali during dyeing.

Details and parameters of a dyeing process according to the first aspect of the invention are presented below, together with the equivalent parameters for a conventional process for dyeing cotton and other cellulosic fibres with reactive dyes, carried out according to the known techniques of the prior art:

| Parameter | Conventional process | Method of the Invention |
|---|---|---|
| Liquor ratio | 12:1 current best norm; 5:1 predicted goal<br>1 tonne fabric = 12 tonnes water | ~1:1<br>1 tonne fabric = $\leq$1 tonne water |
| Electrolyte | 50-100 gL$^{-1}$ NaCl<br>1 tonne fabric @ 50 gL$^{-1}$ electrolyte<br>@ 12:1 L:R = 600 kg of electrolyte | 0 gL$^{-1}$ NaCl<br>1 tonne fabric = 0 kg NaCl |
| Dye fixation | 50-70% | 90+% |
| Alkali | 15 gL$^{-1}$ Na$_2$CO$_3$<br>1 tonne fabric, 15 gL$^{-1}$ Na$_2$CO$_3$<br>@ 12:1 L:R = 180 kg of alkali | 15 gL$^{-1}$ Na$_2$CO$_3$<br>1 tonne fabric, 15 gL$^{-1}$ Na$_2$CO$_3$<br>@ 1:1 L:R = 15 kg of alkali |
| Temperature | 60-98° C. | 65° C. |
| Duration | 90-120 minutes | $\leq$30 minutes |
| Wastewater | large volume<br>(12 tonnes per tonne fabric)<br>high NaCl content (50-100 gL$^{-1}$ NaCl)<br>high dye content | low volume<br>(1 tonne per tonne fabric)<br>zero NaCl content (0 gL$^{-1}$ NaCl)<br>reduced dye content |
| Energy | Using steam tables[5]:<br>1 tonne cotton dyed at 12:1 L:R<br>consumes ~1100 kWh energy | 1 tonne cotton dyed at 1:1 L:R<br>consumes ~180 kWh energy |

Details and parameters of a wash-off process according to the second aspect of the invention are also presented, together with the equivalent parameters for a conventional process for the wash-off of cotton dyed with reactive dyes, carried out according to the known techniques of the prior art:

| Parameter | Conventional process | Method of the Invention |
|---|---|---|
| Liquor ratio | 8/20:1 best norm<br>3-4 stages with overflow rinsing, if required<br>1 tonne fabric = 24-120 tonnes water | 2:1<br>3 stages, no overflow rinsing<br>1 tonne fabric = 11 tonnes water |
| Electrolyte | High electrolyte content<br>1 tonne fabric @ 50 gL$^{-1}$ electrolyte<br>@ 10:1 L:R = 500 kg of electrolyte | No electrolyte in dyed fibre<br>1 tonne fabric = 0 kg NaCl |
| Dye fixation | Low dye fixation (50-70%)<br>High dye level in wash liquor | Higher dye fixation (90+%)<br>Lower dye level in wash liquor |
| Alkali | 15 gL$^{-1}$ Na$_2$CO$_3$<br>High L:R, high alkali in dyed fibre<br>1 tonne fabric, 15 gL$^{-1}$ Na$_2$CO$_3$<br>@ 10:1 L:R = 150 kg of alkali | 15 gL$^{-1}$ Na$_2$CO$_3$<br>Low L:R, low alkali in dyed fibre<br>1 tonne fabric, 15 gL$^{-1}$ Na$_2$CO$_3$<br>@ 1:1 L:R = 15 kg of alkali |
| Wash-off Agent | 1 tonne fabric using 1-3 gL$^{-1}$<br>10:1 L:R = 10-30 kg wash-off agent in effluent | No wash-off agent<br>0 kg wash-off agent in effluent |
| Temperature | 95-98° C. typically for wash-off stage | 40-80° C. typically |
| Duration | 90-110 minutes | 65 minutes |
| Energy | Using steam tables[5]:<br>1 tonne cotton dyed at 10:1 L:R consumes ~2200 kWh energy; | 1 tonne cotton dyed at 1:1 L:R consumes ~420 kWh energy; |
| Wastewater | large volume<br>(24-120 tonnes per tonne fabric)<br>high NaCl content (50-100 gL$^{-1}$ NaCl) | low volume<br>(11 tonnes per tonne fabric)<br>zero NaCl content (0 gL$^{-1}$ NaCl) |

Example 1

This example relates to the application of direct dyes to cotton using dissolved dye.

Scoured and bleached woven cotton fabric (180 gm$^{-2}$) was immersed in tap water for ~5 seconds after which the fabric was mangled so as to provide 70% pick-up. In so doing, the water absorbed by the fabric resulted in a water:fabric liquor ratio (L:R) used in wetting-out of 1:0.7.

An amount of the direct dyes C.I. Direct Blue 71, C.I. Direct Yellow 50 or C.I. Direct Red 81 required to achieve a 2% on mass of fibre (omf) depth of shade was dissolved in an appropriate amount of tap water so as to provide a L:R used in dyeing of 1:1.3. The amount of water required was calculated using Equation 1 below; for this example, the amount of water used to dissolve the direct dye, according to Equation 1 was, (1.13-1.07)=0.6×mass of fabric employed.

$$\text{(amount of water used to dissolve dye or dyeing auxiliary agent/kg)} = (L{:}R \text{ used in dyeing} - L{:}R \text{ used in wetting out}) \times \text{mass of fibre/kg} \quad \text{Equation (1)}$$

The damp fabric was placed inside a container and the dye solution was added. The container was tightly sealed and heated at 65° C. for 30 minutes. At the end of dyeing, the sample was removed and dried.

By way of the method of this example, direct dyeing of cotton was achieved using a L:R of 1:1.3 in the absence of added electrolyte.

The colour strength (f(k) value) of the dyed fabrics obtained by way of this example were calculated from the reflectance values at the appropriate $\lambda_{max}$ for each dyeing measured using a Datacolor Spectroflash 600 reflectance spectrophotometer from 400 nm to 700 nm under illuminant D$_{65}$, using a 10° standard observer with UV component included and specular component excluded. Samples were folded so as to realise two thicknesses and the average of four measurements was taken for each sample. The f(k) values obtained for the 2% omf dyeings were:

C.I. Direct Blue 71: 251.8;
C.I. Direct Yellow 50: 212.2;
C.I. Direct Red 81: 106.5.

The colour strength was also measured, using the method described above, of 2% omf dyeings of C.I. Direct Blue 71, C.I. Direct Yellow 50 and C.I. Direct Red 81 obtained on identical cotton fabric but using a "conventional" dyeing procedure. Thus, scoured and bleached woven cotton fabric (180 g m$^{-2}$) was placed in an aqueous solution comprising 2% omf dye and 20 gL$^{-1}$ NaCl, employing a 20:1 L:R. The ensuing dyebath was heated to 98° C. at a rate of 2° C. per minute and dyeing was continued at this temperature for 45 minutes. After this time, the dyebath was cooled at a rate of 3° C. per minute until a temperature of 40° C. was reached. The dyeing was removed and dried.

The f(k) values obtained for these conventional 2% omf dyeings were:

C.I. Direct Blue 71: 302.6;
C.I. Direct Yellow 50: 178.5;
C.I. Direct Red 81: 105.1.

These findings show that the 2% omf dyeings obtained using a L:R of 1:1.3 at 65° C. for 30 minutes were comparable, in terms of colour strength, to those obtained using the "conventional" dyeing method carried out at 98° C. for 45 minutes in the presence of 20 gL$^{-1}$ electrolyte and using a L:R of 20:1.

Example 2

This example relates to the application of disperse dyes to polyester using a spraying technique.

Scoured woven polyester fabric (130 gm$^{-2}$) was immersed in tap water for ~5 seconds after which the fabric was mangled so as to provide 80% pick-up. In so doing, the water absorbed by the fabric resulted in a water:fabric liquor ratio (L:R) used in wetting-out of 1:0.8.

An amount of the disperse dyes Dianix Blue ACE (DyStar), C.I. Disperse Yellow 114 or C.I. Disperse Red 60 required to achieve a 2% omf depth of shade was dispersed in an appropriate amount of tap water so as to provide a L:R used in dyeing of 1:1.4. The amount of water required was calculated using Equation 1 above, which, in this example, was 0.6×mass of fabric employed.

The dye dispersion was sprayed at a pressure of 3 bar onto one side of the damp polyester fabric which was placed inside an appropriate container. The sealed container was heated to 130° C. at 2° C. per minute and dyeing was continued at this temperature for 10 minutes, after which time the container was cooled at a rate of 3° C. per minute until a temperature of 50° C. was reached. The dyed fabric was removed from the container and dried.

The colour strength (f(k) value) of the dyed fabrics obtained by way of this example were calculated from the reflectance values at the appropriate $\lambda_{max}$ for each dyeing as described in Example 1. The f(k) values obtained for these 2% omf dyeings were:

Dianix Blue ACE: 238.9;
C.I. Disperse Yellow 114: 246.5;
C.I. Disperse Red 60: 358.7.

The colour strength was also measured, using the method described in Example 1, of 2% omf dyeings of Dianix Blue ACE, C.I. Disperse Yellow 114 and C.I. Disperse Red 60 obtained on identical polyester fabric but using a "conventional" dyeing procedure. Thus, scoured and bleached woven polyester fabric (130 gm$^{-2}$) was placed in an aqueous dispersion comprising 2% omf dye, 1 gL$^{-1}$ Levegal DLP (proprietary anionic levelling agent) and 1 gL$^{-1}$ Ludigol AR (anti-reducing agent) at pH 4.5 (McIlvaine buffer), employing a 20:1 L:R. The ensuing dyebath was heated to 140° C. at a rate of 2° C. per minute and dyeing was continued at this temperature for 30 minutes, after which time the dyebath was cooled at a rate of 3° C. per minute until a temperature of 40° C. was reached. The dyeing was removed and dried.

The f(k) values obtained for these conventional 2% omf dyeings were:

Dianix Blue ACE: 245.1;
C.I. Disperse Yellow 114: 252.8;
C.I. Disperse Red 60: 379.9.

These results reveal that the 2% omf dyeings obtained using a L:R of 1:1.4 at 130° C. for 10 minutes were comparable, in terms of colour strength, to those obtained using the "conventional" dyeing method carried out at 140° C. for 30 minutes in the presence of two proprietary auxiliary agents, at pH 4.5 and using a L:R of 20:1.

The dyeing process was also carried out in the absence of dispersing agents and anti-reducing agents, and it was possible to achieve dyeing of polyester in the absence of these agents using a L:R of 1:1.4 at 130° C.

Example 3

This example relates to the application of reactive dyes to cotton using solid dye.

A 10 gL$^{-1}$ aqueous solution of an anionic surfactant such as dibutyl maleate was prepared. Scoured and bleached woven cotton fabric (180 gm$^{-2}$) was immersed in the aqueous surfactant solution for ~5 seconds after which the fabric was mangled so as to provide 130% pick-up.

The damp fabric was placed inside a container and an amount of the reactive dyes C.I. Reactive Black 5, C.I. Reactive Blue 19, Remazol Yellow R gran, or C.I. Reactive Red 198 required to achieve a 2% omf depth of shade was added. The container was then tightly sealed and heated at 65° C. for 10 minutes, after which time an appropriate amount of alkali was added so as to achieve a concentration of 5 gL$^{-1}$. The sealed container was heated at 65° C. for a further 20 minutes, after which the fabric was removed, rinsed with water and dried.

By way of this example, reactive dyeing of cotton was achieved using a L:R 1:3 in the absence of added electrolyte at 65° C. for 30 minutes.

Other surfactant types can be used including non-ionic, cationic and amphoteric, as well as appropriate blends thereof.

The colour strength (f(k) value) of the dyed fabrics obtained by way of this example were calculated from the reflectance values at the appropriate $\lambda_{max}$ for each dyeing as described in Example 1. The f(k) values obtained for these 2% omf dyeings were:

C.I. Reactive Black 5: 239.5;
C.I. Reactive Blue 19: 101.5;
Remazol Yellow R gran: 111.4;
C.I. Reactive Red 198: 82.2.

The colour strength was also measured, using the method described in Example 2, of 2% omf dyeings of C.I. Reactive Black 5, C.I. Reactive Blue 19, Remazol Yellow R gran and or C.I. Reactive Red 198 obtained on identical cotton fabric but using a "conventional" dyeing procedure. Thus, scoured and bleached woven cotton fabric (180 g m$^{-2}$) was placed in an aqueous solution comprising 2% omf dye and 50 gL$^{-1}$ NaCl employing a 20:1 L:R. The ensuing dyebath was heated to 60° C. at a rate of 2° C. per minute and dyeing continued at this temperature for 60 minutes, after which time 15 gL$^{-1}$ Na$_2$CO$_3$ was added and dyeing continued at 60° C. for a further 60 minutes. The dyebath was then cooled at a rate of 3° C. per minute until a temperature of 40° C. was reached. The dyeing was removed and dried.

The f(k) values obtained for these conventional 2% omf dyeings were:

C.I. Reactive Black 5: 221.5;
C.I. Reactive Blue 19: 113.3;
Remazol Yellow R gran: 98.5;
C.I. Reactive Red 198: 63.5.

These results show that the 2% omf dyeings obtained using a L:R of 1:3 at 65° C. for 30 minutes in the absence of added electrolyte were comparable, in terms of colour strength, to those obtained using the "conventional" dyeing method carried out at 60° C. for 120 minutes in the presence of 50 gL$^{-1}$ electrolyte and using a L:R of 20:1.

Example 4

This example relates to the application of non-metallised acid dyes to nylon using a spraying technique.

Scoured and bleached knitted nylon 6,6 fabric (166 gm$^{-2}$) was immersed in water for ~5 seconds after which the fabric was mangled so as to achieve 68% pick-up. In so doing, the water absorbed by the fabric resulted in a water:fabric liquor ratio (L:R) used in wetting-out of 1:0.7.

An amount of the non-metallised acid dyes C.I. Acid Blue 80, C.I. Acid Red 1, or C.I. Acid Yellow 17 required to achieve a 2% omf depth of shade, together with an amount of an anionic surfactant such as dibutyl maleate required to achieve a concentration of 2% omf, were dissolved in an appropriate amount of tap water so as to provide a L:R used in dyeing of 1:2.3. The amount of this water required was calculated using Equation 1 above, which, for this example, amounted to 1.6×mass of fabric employed.

An amount of acetic acid was added to the dye solution so as to achieve a pH of 3.0.

The acidified dye solution was sprayed at a pressure of 3 bar onto one side of the damp nylon fabric which was placed inside an appropriate container. The sealed container was heated to 75° C. at 2° C. per minute, and dyeing was continued at this temperature for 40 minutes, after which time the container was cooled at a rate of 3° C. per minute until a temperature of 50° C. was reached. The dyed fabric was removed from the container and dried.

The invention permits the use of a wide range of acidic pH values, from pH 2.0 to pH 7.0, preferably within the range pH 3.0 to pH 5.0; the desired pH can be achieved through the use of various acids and/or buffer systems.

The colour strengths (f(k) values) of the dyed fabrics obtained by way of this example were calculated from the reflectance values at the appropriate $\lambda_{max}$ for each dyeing as described in Example 1. The f(k) values obtained for these 2% omf dyeings were:

C.I. Acid Blue 80: 117.0;
C.I. Acid Red 1: 115.5;
C.I. Acid Yellow 17: 51.7.

The colour strength was also measured, using the method described in Example 2, of 2% omf dyeings of C.I. Acid Blue 80, C.I. Acid Red 1 and C.I. Acid Yellow 17 obtained on identical nylon 6,6 fabric but using a "conventional" dyeing procedure. Thus, scoured and bleached nylon 6,6 fabric (166 gm$^{-2}$) was placed in an aqueous solution comprising 2% omf dye and 20 gL$^{-1}$ Na$_2$SO$_4$, at pH 4.5 (McIlvaine buffer), employing a 20:1 L:R. The ensuing dyebath was heated to 98° C. at a rate of 2° C. per minute and dyeing continued at this temperature for 60 minutes, after which time the dyebath was cooled at a rate of 3° C. per minute until a temperature of 50° C. was reached. The dyeing was removed and dried.

The f(k) values obtained for these conventional 2% omf dyeings were:

C.I. Acid Blue 80: 109.5;
C.I. Acid Red 1: 118.2;
C.I. Acid Yellow 17: 51.9.

These findings reveal that the 2% omf dyeings obtained using a L:R of 1:2.3 for 40 minutes at 75° C. were comparable, in terms of colour strength, to those obtained using the "conventional" dyeing method carried out at 90° C. for 60 minutes in the presence of sodium sulphate and using a L:R of 20:1.

Example 5

This example relates to the application of pre-metallised acid dyes to silk using dissolved dye.

The procedure described in Example 4 was repeated except that woven silk fabric (170 gm$^{-2}$) was immersed in water for ~5 seconds after which the fabric was mangled so as to provide 80% pick-up. In so doing, the water absorbed by the fabric resulted in a water:fabric liquor ratio (L:R) used in wetting-out of 1:0.7.

An amount of the pre-metallised acid dyes Supra/an Blue GLW, Supra/an Red S-RL, Supra/an Yellow 4GL or Supra/an Black S-B required to achieve a 2% omf depth of shade, together with an amount of an anionic surfactant such as dibutyl maleate required to achieve a concentration of 2% omf, were dissolved in an appropriate amount of tap water so as to provide a L:R used in dyeing of 1:2.2. The amount of this water required was calculated using Equation 1 above which, for this example, amounted to 0.52×mass of fabric employed.

The damp fabric was placed inside a container and the dye solution was added. The container was tightly sealed and heated at 65° C. for 30 minutes after which time, the dyed sample was removed and dried.

By way of this example, silk was dyed using pre-metallised acid dyes using a L:R 1:2.2 in the absence of added acid, and after 30 minutes at low temperature.

Example 6

This example relates to the application of reactive dyes to cotton using separate pellets of dye and additional assisting agent in a single stage procedure.

The reactive dyes C.I. Reactive Black 5, C.I. Reactive Blue 19, Remazol Yellow R gran, or C.I. Reactive Red 198 were mixed with microcrystalline cellulose and polyethylene glycol in the mass % ratio 10:70:20, and the ensuing admixture was formed into a pressed pellet.

Sodium carbonate was mixed with microcrystalline cellulose in the mass % ratio 20:80 and the resulting mixture was formed into a pressed pellet.

Scoured and bleached woven cotton fabric (180 gm$^{-2}$) was immersed in water for ~5 seconds, after which the fabric was mangled so as to provide 70% pick-up. In so doing, the water absorbed by the cellulosic material resulted in a water:fabric liquor ratio (L:R) used in wetting-out of 1:0.7.

The damp fabric was placed inside a container and an amount of reactive dye pellet required to achieve a 2% omf depth of shade was added together with an appropriate amount of alkali pellet required to achieve a concentration of 5 gL$^{-1}$. The container was tightly sealed and heated at 65° C. for 30 minutes, after which time the dyed fabric was removed, rinsed with water and dried.

By way of this example, reactive dyeing of cotton was achieved using a L:R 1:07 in the absence of added electrolyte, and using the combined, controlled release of dye and alkali, each from pellet form.

In an alternative procedure, the reactive dye and alkali pellets may be added in a two-stage process wherein the dye is added and the sealed container is heated at 65° C. for 10 minutes, after which the alkali addition takes place and the sealed container is heated at 65° C. for a further 20 minutes, providing comparable results.

Example 7

This example relates to the application of non-metallised acid dyes to wool using dissolved dye.

Scoured and bleached woven wool fabric (240 gm$^{-2}$) was immersed in water for ~5 seconds, after which time the fabric was mangled so as to achieve 56% pick-up. In so doing, the water absorbed by the fabric resulted in a water:fabric liquor ratio (L:R) used in wetting-out of 1:0.56.

An amount of the non-metallised acid dyes C.I. Acid Blue 80, C.I. Acid Red 1, or C.I. Acid Yellow 17 required to achieve a 2% omf depth of shade, together with an amount of an anionic surfactant such as dibutyl maleate required to achieve a concentration of 2% omf, were dissolved in an appropriate amount of tap water so as to provide a L:R used in dyeing of 1:1.2. The amount of this water required was calculated using Equation 1 above, which, for this example, amounted to 0.64×mass of fabric employed.

The damp fabric was placed inside a container and the dye solution was added. The container was tightly sealed and heated at 65° C. for 30 minutes. At the end of dyeing, the sample was removed and dried.

By way of this example, wool was dyed using non-metallised acid dyes employing a L:R of 1:1.2 after 30 minutes at low temperature.

The colour strength (f(k) value) of the dyed fabrics obtained by way of this example were calculated from the reflectance values at the appropriate $\lambda_{max}$ for each dyeing as described in Example 1. The f(k) values obtained for these 2% omf dyeings were:

C.I. Acid Blue 80: 245.1;
C.I. Acid Red 1: 241.2;
C.I. Acid Yellow 17: 119.6.

The colour strength was also measured, using the method described in Example 2, of 2% omf dyeings of C.I. Acid Blue 80, C.I. Acid Red 1 and C.I. Acid Yellow 17 obtained on identical wool fabric, but using a "conventional" dyeing procedure. Thus, scoured and bleached wool fabric (240 $gm^{-2}$) was placed in an aqueous solution comprising 2% omf dye and 10 $gL^{-1}$ $Na_2SO_4$, at pH 4.0 (McIlvaine buffer), employing a 20:1 L:R. The ensuing dyebath was heated to 95° C. at a rate of 2° C. per minute and dyeing continued at this temperature for 60 minutes, after which time the dyebath was cooled at a rate of 3° C. per minute until a temperature of 50° C. was reached. The dyeing was removed and dried.

The f(k) values obtained for these conventional 2% omf dyeings were:

C.I. Acid Blue 80: 247.5;
C.I. Acid Red 1: 254.7;
C.I. Acid Yellow 17: 123.4.

These findings show that the 2% omf dyeings obtained using a L:R of 1:1.2 for 30 minutes at 65° C. with pH unadjusted were comparable, in terms of colour strength, to those obtained using the "conventional" dyeing method carried out at 95° C. for 60 minutes in the presence of sodium sulphate at pH 4.0 and using a L:R of 20:1.

Thus, the present invention provides an ultra-low water application method which is applicable to the treatment of all textile fabrics with any dyes and/or finishing agents and provides results which are at least as good as, and typically better than, those achieved by means of conventional processes.

Example 8

This example relates to the application of reactive dyes to cotton using different levels of alkali in the dyebath.

Three dyes were used in the example, namely C.I. Reactive Black 5 (bis vinyl sulfone), C.I. Reactive Red 198 (aminochlorotriazine/masked vinyl sulfone) and Remazol Yellow R (vinyl sulfone).

2% omf dyeings of C.I. Reactive Black 5, employing a 1:1 L:R in the absence of electrolyte and using 5, 10, 15 and 20 $gL^{-1}$ $Na_2CO_3$ were carried out according to the method of the first aspect of the invention, as illustrated in FIG. 1, in a sealed 300 $cm^3$ plastic bag housed within a sealed 1400 $cm^3$ polypropylene sandwich box which was tumbled in a White Knight tumble dryer.

Simultaneously, conventional 2% omf dyeings of C.I. Reactive Black 5 were carried out, as illustrated in FIG. 2, in sealed 300 $cm^3$ capacity stainless steel dyepots housed in a Roaches Pyrotec S dyeing machine employing 20:1; 10:1 and 5:1 L:R, in both the presence and absence of 50 $gL^{-1}$ electrolyte and 15 $gL^{-1}$ alkali.

For each of the dyeing procedures, at the end of dyeing, the sample was removed from the dyebath, squeezed to remove surplus dye liquor and subjected to the conventional prior art wash-off procedure[6,7], which is illustrated in FIG. 3, using a 20:1 L:R for each stage, in sealed, 300 $cm^3$ capacity, stainless steel dyepots housed in a Roaches Pyrotec S dyeing machine; the proprietary wash-off agent, Cyclanon XC-W New (BASF) was employed for the boil stage. The washed-off dyeing was allowed to dry in the open air.

The results are shown in FIGS. 4 and 5. Thus, it is seen from FIG. 4 that, as expected, when 2% omf dyeings of C.I. Reactive Black 5 were produced using the Rotadyer (300 $cm^3$ tubes; 2° C. $min^{-1}$ ramp), employing the conventional dyeing method of FIG. 2 (120 minutes; 50 $gL^{-1}$ electrolyte), colour strength increased with decreasing L:R both before and after wash-off. This effect is attributable to increased dye-fibre substantivity imparted by a combination of reduced dye solubility and increased dye-fibre fixation.

FIG. 4 also shows that when dyeings were produced in the absence of electrolyte, whilst colour strength was reduced for each of the three L:R's used, the colour strength of the dyeings both before and after wash-off also increased with decreasing L:R which, again, can be attributed to increased dye-fibre substantivity imparted by a combination of reduced dye solubility and increased dye-fibre fixation. Interestingly, it is observed that the difference in f(k) (shown on the y-axis of FIG. 4) before and after wash-off was greater when dyeing had been carried out in the absence of electrolyte, presumably because of lower dye exhaustion.

Turning to FIG. 5, it is seen that when 2% omf dyeings of C.I. Reactive Black 5 were produced according to the method of the first aspect of the invention, employing 5, 10, 15 and 30 $gL^{-1}$ $Na_2CO_3$ for 30 minutes in the absence of electrolyte, colour strength increased with increasing amount of alkali used over the range 5-15 $gL^{-1}$, both before and after wash-off. This can be attributed to increased dye-fibre substantivity imparted by a combination of reduced dye solubility and increased dye-fibre fixation; a slight decrease in colour strength accompanied an increase in alkali concentration to 20 $gL^{-1}$. Notably, the f(k) values, both before and after wash-off recorded for the conventional dyeing, which employed a 20:1 L:R, 15 $gL^{-1}$ $Na_2CO_3$ and 50 $gL^{-1}$ NaCl, were lower than those for the 1:1 L:R dyeing according to the method of the invention, which had been carried out using 15 $gL^{-1}$ $Na_2CO_3$ and zero NaCl.

An interesting corollary of employing a low L:R in the reactive dyeing of cotton is the effect upon the amount of electrolyte used per mass of fabric. As is illustrated in Table 1, the volume of dye liquor used is determined by L:R; this means that, because alkali concentration is determined by the volume of the dye liquor (i.e. the amount of $Na_2CO_3$ used is measured in $gL^{-1}$), the amount of alkali employed per mass of fibre decreases markedly with decreasing L:R.

TABLE 1

AMOUNT OF ALKALI USED PER KG OF FABRIC

| L:R | amount of liquor used/L | $Na_2CO_3$ conc./$gL^{-1}$ | amount of alkali used per kg of fabric/g |
|---|---|---|---|
| 20:1 | 20 | 15 | 300 |
| 5:1 | 5 | 15 | 75 |
| 1:1 | 1 | 15 | 15 |

Thus, it can be seen that:
1 T fabric dyed using a 20:1 L:R uses 300 kg of alkali;
1 T fabric dyed using a 5:1 L:R uses 75 kg of alkali;
1 T fabric dyed using a 1:1 L:R uses 15 kg of alkali.
Hence, a 1:1 L:R dyeing consumes 80% less alkali than dyeing at a 5:1 L:R and 95% less alkali than dyeing at a 20:1

L:R. It follows, therefore, that the lower the amount of alkali used, then the less wash-off/rinsing is required to remove the residual $Na_2CO_3$ at the conclusion of the dyeing process.

The same dyeing processes were carried out using the other two dyes (C.I. Reactive Red 198 and Remazol Yellow R) and the comparative results for these dyes and C.I. Reactive Black 5 are set out in FIG. 6, from which it is apparent that when 2% omf dyeings were produced using the three dyes, the 1:1 dyeing method (undertaken in the absence of electrolyte and using 15 $gL^{-1}$ $Na_2CO_3$) according to the first aspect of the invention provided deeper shades than those obtained using the conventional 20:1 L:R method (50 $gL^{-1}$ electrolyte; 15 $gL^{-1}$ alkali) both before and after wash-off.

The dyeings were compared visually and in terms of the results obtained from the wash-off procedure. FIG. 7 shows the amount of surplus (unfixed and hydrolysed) dye which was removed by each of the three wash-off stages of the conventional prior art wash-off method illustrated in FIG. 3 for (a) the conventional dyeing which had been carried out using a 20:1 L:R, 50 $gL^{-1}$ electrolyte and 15 $gL^{-1}$ alkali. It is clear that the first wash-off stage removed most surplus dye, which was expected, as it is widely accepted that the first rinse stage in the conventional wash-off of reactive dyes is important as it is responsible, not only for removing the more easily removed unfixed dye, but also for reducing the often very high electrolyte concentration within the substrate. The deep colour of the residual liquor from the first wash-off stage can, therefore, be attributed to the removal of easily removed unfixed dye.

FIG. 7(a) also shows that dye removal continued during the second rinse stage, which involved treatment with the commercial wash-off agent at the boil. However, it is clear that lower amounts of dye were removed, presumably because a lower amount of easily removed dye was present within the substrate. During this particular stage of a conventional wash-off process, the electrolyte level in the fibre is further lowered, this being essential for the expeditious removal of unfixed reactive dye during subsequent wash-off stages. Unfixed dye was also removed during the third stage of wash-off, also illustrated in FIG. 7(a), which involved treatment with water only at 40° C.; it is evident that very little dye was removed during this final wash-off stage.

FIG. 7(b) shows the amount of unfixed and hydrolysed dye which was removed by each of the three wash-off stages of the conventional prior art wash-off method for the dyeing according to the method of the invention, which was carried out at 1:1 L:R using zero electrolyte and 15 $gL^{-1}$ alkali. It is again evident that the first wash-off stage removed most surplus dye, this corresponding to the more easily removed unfixed dye, and that dye removal continued during the second rinse stage, which involved treatment with the commercial wash-off agent at the boil although, as with the standard dyeing, less dye was removed. The third wash-off stage, which involved treatment with water only at 40° C., removed little further dye.

Thus, a comparison of FIGS. 7(a) and (b) shows that there was a small difference between the results obtained for the standard dyeing and the dyeing according to the invention, insofar as more dye appears to have been removed in the latter case, although this may be attributable to the slightly higher colour strength of this particular dyeing.

On inspecting the dyeings, it was observed that for each of the three dyes studied, the method of the invention provides dyeings which are of at least comparative colour strength to those secured using the standard dyeing method. As noted above, there was little difference between the amounts of dye removed when the two dyeings were washed-off using the BASF recommended wash-off method, which implies that similar levels of dye adsorption and fixation were achieved using the two different methods.

Example 9

This example illustrates the novel three-stage wash-off method according to the invention which uses a 2:1 L:R and compares the results obtained with those achieved using conventional wash-off methods.

At the conclusion of each wash-off stage, samples of the residual wash-off liquor were collected and allowed to cool to ambient temperature before being compared.

Cotton fabrics were dyed to 2% omf depth of shade with C.I. Reactive Black 5 in sealed, 300 $cm^3$ capacity, stainless steel dyepots housed in a Roaches Pyrotec S dyeing machine, using the conventional dyeing procedure described in FIG. 2, employing a 20:1 L:R, 50 $gL^{-1}$ electrolyte and 15 $gL^{-1}$ alkali. The dyed samples were removed from the dyebath, squeezed to remove surplus dye liquor and then subjected to the following different wash-off processes.

1. Conventional Prior Art Method Using Cyclanon® XC-W New

The wash-off procedure shown in FIG. 3 was followed for the dyeings, using a 20:1 L:R for each stage, in sealed 300 $cm^3$ capacity stainless steel dyepots housed in a Roaches Pyrotec S dyeing machine. The washed-off dyeings were finally rinsed in tap water and allowed to dry in the open air.

2. Single Low L:R Wash Bath Method According to the Invention

The dyed sample was wetted-out with sufficient tap water to constitute a 2:1 L:R and placed in a sealed container of suitable ullage to permit adequate fabric agitation which was heated to 65° C. and maintained at this temperature for 10 minutes, after which time the dyed sample was removed, rinsed in cold tap water and squeezed, according to the process shown in FIG. 8. The damp dyeing was placed in a sealed container of suitable ullage to permit adequate fabric agitation, together with sufficient tap water to provide a 20:1 L:R, and was then treated at 98° C. for 10 minutes. The dyed sample was removed, rinsed in cold tap water, squeezed, and then placed in a sealed container of suitable ullage to permit adequate fabric agitation, together with sufficient tap water to give a 20:1 L:R. The sealed dye pot was then treated at 70° C. for 10 minutes, before the washed-off dyeing was finally rinsed in tap water and allowed to dry in the open air.

3. Double Low L:R Wash Bath Method According to the Invention

As illustrated in FIG. 9, the dyed sample was wetted-out with sufficient tap water to provide a liquor ratio of 2:1, and placed in a sealed container of suitable ullage to permit adequate fabric agitation. The sealed container was heated to 65° C. and kept at this temperature for 10 minutes, after which time the dyed sample was removed, rinsed with cold tap water, squeezed, and then placed in a sealed container of suitable ullage to permit adequate fabric agitation, and the wash-off process was repeated for 15 minutes, employing a 2:1 L:R. The dyed sample was then removed, rinsed in cold tap water, squeezed, and placed in a sealed container of suitable ullage to permit adequate fabric agitation, together with sufficient tap water to constitute a 20:1 L:R, and the sealed container was then heated at 70° C. for 10 minutes. The washed-off dyeing was finally rinsed in tap water and allowed to dry in the open air.

The washed-off dyeings were then subjected to the ISO 105:C06/C2S wash test method, and the results are illustrated in FIG. 10, which shows the colour strength obtained for 2% omf standard dyeings (20:1 L:R, 50 gL$^{-1}$ electrolyte and 15 gL$^{-1}$ alkali) before and after wash-off according to the three different methods. It is evident that each of the three wash-off processes removed similar amounts of surplus dye from the dyeings and that there was little difference between the standard, three-stage wash-off method which used the proprietary wash-off agent, Cyclanon® XC-W New and each of the three-stage wash-off processes which employed no wash-off agent, in terms of the amounts of dye removed.

The results shown in FIG. 10 show that both the single low liquor ratio wash bath method, which uses one water rinse employing a 2:1 L:R, together with two water rinses using a 20:1 L:R, one being at the boil, as well as the simpler double low liquor ratio wash bath which involves two water rinses employing a 2:1 L:R and one rinse stage at 70° C. employing a 20:1 L:R, produced equivalent performance to the conventional wash-off method which employed three stages, each using a 20:1 L:R, with one boil stage that uses 3 gL$^{-1}$ Cyclanon® XC-W New. The double low liquor ratio wash bath method in particular clearly offers major savings in terms of water usage, time, temperature and chemicals. The effectiveness of both the single and double low liquor ratio was bath treatments can be attributed to the provision of a warm, saturated vapour which expedites dye removal, even at relatively low temperatures and times (i.e. 65-70° C. for 10-15 minutes).

Example 10

This example illustrates the novel two-stage wash-off method according to the invention which uses 5:1 and 10:1 L:R and compares the results obtained with those achieved using conventional wash-off methods.

2% omf dyeings (C.I. Reactive Black 5), employing a 1:1 L:R in the absence of electrolyte and using 15 gL$^{-1}$ Na$_2$CO$_3$, were carried out in a sealed 1000 cm$^3$ plastic bag within a 1400 cm$^3$ polypropylene sandwich box which was housed in a White Knight tumble dryer for both 30 and 45 minutes at 65° C. according to a low substantivity dyeing method of the first aspect of the invention, as illustrated in FIG. 12.

At the end of the low substantivity dyeing process, the dyed sample was removed from the dyebath, squeezed to remove surplus dye liquor and subjected to the BASF recommended wash-off procedure shown in FIG. 3, using a 20:1 L:R for each stage, in sealed, 300 cm$^3$ capacity, stainless steel dyepots housed in a Roaches Pyrotec S dyeing machine; the proprietary wash-off agent, Cyclanon XC-W New (BASF) was employed for the boil stage. The washed-off dyeing was allowed to dry in the open air.

Two-stage wash-off processes according to the second aspect of the invention were carried out wherein different temperatures (ambient, 50° C., 65° C., 80° C. and 98° C.) were used for each of the two wash-off baths, and the results obtained were compared to those secured using the conventional BASF wash-off process described above.

Wash-Off Stage 1

At the end of the dyeing process, the sample was removed from the dyebath and placed in heated (50° C., 80° C. and 98° C.) 300 cm$^3$ capacity, stainless steel dyepots housed in a Roaches Pyrotec S dyeing machine for 15 minutes, according to the procedures illustrated in FIGS. 13, 14 and 15. In the cases of wash-offs carried out at both ambient (cold) and 65° C., on completion of dyeing, the dyeing in the sandwich box was left to run in the tumble dryer for a further 15 minutes, as shown in FIGS. 16 and 17, respectively.

Wash-Off Stage 2

At the end of each of the first wash-off treatments described above, each washed-off dyeing was removed from the dye tube/sandwich box, squeezed to remove surplus dye liquor and then placed in heated (50° C., 80° C. and 98° C.) 300 cm$^3$ capacity, stainless steel dyepots housed in a Roaches Pyrotec S dyeing machine for 15 minutes, employing water at a L:R of 5:1, according to the schemes of FIGS. 13, 14 and 15. In the case of wash-off at 65° C., the dyeing was removed from the sandwich box, squeezed to remove surplus dye liquor, placed in a sandwich box and subjected to wash-off at 65° C., using water at a 5:1 L:R, as shown in FIG. 17. With the ambient wash-off, at the end of the first wash-off treatment, the dyeing was removed from the sandwich box, squeezed to remove surplus dye liquor, placed in a 300 cm$^3$ capacity, stainless steel dye pot housed in a Roaches Pyrotec S dyeing machine and subjected to wash-off at room temperature, using water at a 10:1 L:R, according to the scheme of FIG. 16.

In each case, the washed-off dyeings were squeezed and allowed to dry in the open air.

The washed-off dyeings were subjected to the ISO 105-CO6/C2S wash fastness test.

The example was specifically directed to providing a two bath wash-off process for reactive dyes which had been applied to cotton fabric using the dyeing method according to the invention which is illustrated in FIG. 12.

Conventional Dyeing and Conventional Wash-Off

For comparison purposes, results obtained for 2% omf dyeings of C.I. Reactive Black 5 which had been carried out using the standard 20:1 L:R dyeing method of the prior art (typically 50 gL$^{-1}$ NaCl and 15 gL$^{-1}$ Na$_2$CO$_3$, 120 mins, 65° C.) in sealed, 300 cm$^3$ capacity, stainless steel dyepots housed in a Roaches Pyrotec S dyeing machine are presented herewith. Table 2 shows the results obtained for a dyeing which had been squeezed, but not washed-off; the corresponding results obtained for a standard 20:1 L:R dyeing after it had been washed-off using the BASF recommended wash-off process illustrated in FIG. 3 are shown in Table 3, whilst Table 4 provides details of the fastness to the ISO CO6/C2S wash test of a standard dyeing which had been washed-off using the BASF wash-off process. The colour strength for the dyeings both before and after wash-off is illustrated in FIG. 18.

TABLE 2

COLORIMETRIC PARAMETERS BEFORE ISO 105-CO6/C2S WASH FASTNESS TEST

| duration of 1:1 L:R dyeing method/ mins | temp of extended dyeing/° C. | wash-off temperature/ ° C. | L* | a* | b* | C* | h° | λ$_{max}$ |
|---|---|---|---|---|---|---|---|---|
| 20:1 L:R standard dyeing (50 gl$^{-1}$ NaCl, 15 gl$^{-1}$ Na$_2$CO$_3$) | | BASF | 20.6 | −2.1 | −13.8 | 14.0 | 261.0 | 600 |

TABLE 2-continued

COLORIMETRIC PARAMETERS BEFORE ISO 105-CO6/C2S WASH FASTNESS TEST

| duration of 1:1 L:R dyeing method/mins | temp of extended dyeing/° C. | wash-off temperature/° C. | L* | a* | b* | C* | h° | $\lambda_{max}$ |
|---|---|---|---|---|---|---|---|---|
| 30 | n/a | BASF | 19.5 | −1.3 | −12.9 | 13.0 | 263.8 | |
| 30 + 15 | 65 | | 19.2 | −1.0 | −12.7 | 12.8 | 265.3 | |
| 30 + 15 | 65 | room | 20.2 | −1.7 | −12.9 | 13.0 | 262.4 | |
| 30 + 15 | 50 | 50 | 20.0 | −1.3 | −13.6 | 13.7 | 264.4 | |
| 30 + 15 | 65 | 65 | 19.7 | −1.1 | −13.4 | 13.4 | 265.1 | |
| 30 + 15 | 80 | 80 | 20.1 | −1.2 | −13.5 | 13.6 | 264.5 | |
| 30 + 15 | 98 | 98 | 21.6 | −2.1 | −14.1 | 14.3 | 261.4 | |

A comparison of the results displayed in Tables 2 and 3 reveals that the conventional, six-treatment bath BASF wash-off process removed surplus (unfixed and hydrolysed) dye, as observed in previous tests. Table 3 shows that the fastness of the 2% omf dyeing, which had been washed-off using the BASF process, to the ISO CO6/C2S wash test was excellent, with no staining of adjacent materials by vagrant dye and no change in shade of the dyeing.

invention (30 minutes, 65° C., as illustrated in FIG. 12); the dyeing was squeezed, but not washed-off. The corresponding results secured for the dyeing after it had been washed-off using the conventional BASF wash-off process illustrated in FIG. 3 are shown in Table 3. A comparison of these results reveals that surplus unfixed/hydrolysed dye was removed by the six-treatment bath BASF wash-off process, as expected. Table 4 shows that the fastness to the ISO

TABLE 3

COLORIMETRIC PARAMETERS AFTER ISO 105-CO6/C2S WASH FASTNESS TEST

| duration of 1:1 L:R dyeing method/mins | temp of extended dyeing/° C. | wash-off temperature/° C. | L* | a* | b* | C* | h° | $\lambda_{max}$ |
|---|---|---|---|---|---|---|---|---|
| 20:1 L:R standard dyeing (50 gl$^{-1}$ NaCl, 15 gl$^{-1}$ Na$_2$CO$_3$) | | BASF | 21.0 | −2.6 | −13.9 | 14.1 | 259.3 | 600 |
| 30 | n/a | BASF | 20.6 | −2.1 | −13.2 | 13.4 | 260.7 | |
| 30 + 15 | 65 | | 19.8 | −1.5 | −12.6 | 12.7 | 263.2 | |
| 30 + 15 | 65 | room | 19.8 | −1.3 | −12.6 | 12.6 | 263.8 | |
| 30 + 15 | 50 | 50 | 20.5 | −1.4 | −12.7 | 12.8 | 263.5 | |
| 30 + 15 | 65 | 65 | 19.8 | −1.2 | −12.6 | 12.7 | 264.3 | |
| 30 + 15 | 80 | 80 | 20.2 | −1.2 | −13.1 | 13.2 | 264.5 | |
| 30 + 15 | 98 | 98 | 22.7 | −2.2 | −14.9 | 15.0 | 261.3 | |

TABLE 4

FASTNESS OF WASHED-OFF DYEINGS TO THE ISO 105-CO6/C2S WASH TEST

| duration of 1:1 L:R dyeing method/mins | temp of extended dyeing/° C. | wash-off temperature/° C. | change of shade | staining of adjacent | | | | | |
|---|---|---|---|---|---|---|---|---|---|
| | | | | wool | acrylic | polyester | polyamide | cotton | 2° acetate |
| 20:1 L:R standard dyeing (50 gl$^{-1}$ NaCl, 15 gl$^{-1}$ Na$_2$CO$_3$) | | BASF | 5 | 5 | 5 | 5 | 5 | 5 | 5 |
| 30 | n/a | BASF | 5 | 5 | 5 | 5 | 5 | 4/5-5 | 5 |
| 30 + 15 | 65 | | 5 | 5 | 5 | 5 | 5 | 5 | 5 |
| 30 + 15 | 65 | room | 5 | 5 | 5 | 5 | 5 | 4/5-5 | 5 |
| 30 + 15 | 50 | 50 | 4/5-5 | 4/5-5 | 5 | 5 | 5 | 4/5-5 | 5 |
| 30 + 15 | 65 | 65 | 4/5-5 | 4/5-5 | 5 | 5 | 5 | 4/5-5 | 5 |
| 30 + 15 | 80 | 80 | 5 | 5 | 5 | 5 | 5 | 4/5-5 | 5 |
| 30 + 15 | 98 | 98 | 5 | 5 | 5 | 5 | 5 | 5 | 5 |

Dyeing According to the Method of the Invention and Conventional Wash-Off

Table 2 also shows the colorimetric data obtained for 2% omf dyeings of C.I. Reactive Black 5 which had been carried out using the 1:1 L:R dyeing process according to the CO6/C2S wash test of the 30 minute dyeing which had been washed-off using the BASF wash-off process was high, although the cotton adjacent was lightly stained by vagrant dye and the dyeing underwent a small shade change as a result of washing.

In addition, Table 2 shows the colorimetric data obtained for 2% omf dyeings of C.I. Reactive Black 5 which had been produced using the 1:1 L:R dyeing process shown in FIG. 12, but carried out for 45 minutes rather than 30 minutes at 65° C.; the dyeing had been squeezed, but not washed-off. The corresponding results obtained for the 45 minute dyeing after it had been washed-off using the conventional wash-off process are shown in Table 3. Surplus dye was clearly removed by the six treatment bath BASF wash-off process, as anticipated; the fastness of the washed-off 45 minute dyeing to the ISO CO6/C2S wash test (Table 4) was excellent, no change in shade or staining of adjacent materials having occurred.

As previously observed, an effective three-stage wash-off method has been devised in which a dyeing which had been produced using the 1:1 L:R method for 30 minutes, according to the invention, then squeezed, was subjected to treatment in two baths, each of 10-15 minute duration and employing a 2:1 L:R, followed by a third treatment in a bath at 70° C. for 10 minutes. However, cold water rinses were also performed at the end of each of the three wash-off baths, meaning that the wash-off process involved a total of six treatment baths with water.

When conducting the present experiments, the purpose of extending the dyeing time at 65° C. from 30 minutes to 45 minutes was to attempt to replicate a 15 minute wash-off treatment. The results presented in Tables 2, 3 and 4 clearly show that extending the dyeing time at 65° C. from 30 to 45 minutes had beneficial effects on both colour yield and wash fastness. The finding (illustrated in FIG. 18) that the colour strength of the 45 minute dyeing was greater than that of its 30 minute counterpart, both before and after wash-off, can be attributed to greater dye fixation having been achieved in the case of the longer dyeing process. Thus, although the fastness of the washed-off 30 minute 1:1 L:R dyeing was very good, that of the 45 minute dyeing was seen to be better (Table 4); this is all the more significant bearing in mind that the 45 minute dyeing was of greater colour strength, as seen in FIG. 18. The excellent wash fastness of the 45 minute dyeing can also be attributed to greater dye fixation having been achieved in the case of the longer dyeing process.

Thus, it is seen that extending dyeing time from 30 to 45 minutes was effective in terms of both colour yield and fastness.

Dyeing and Wash-Off According to the Method of the Invention

As noted above, this example was specifically focused on an attempt to replace both the conventional BASF wash-off process and the existing low L:R wash-off process (each of which comprised a total of six treatment baths when the three additional rinse stages using water were taken into account), with a two bath process, wherein no rinse stages were required. Thus, in accordance with the procedure previously described, on conclusion of dyeing the dyed sample was removed, squeezed to remove surplus dye liquor, and then subjected to a total of two treatment baths, using the following steps:

Bath 1: Sandwich Box/Dyeing Tube; Ambient Temperature, 50° C., 65° C., 80° C. or 98° C.; 15 minutes; water 5:1 L:R;
Squeeze;
Bath 2: Sandwich Box/Dyeing Tube; Cold; 3 minutes; water 10:1 L:R;
Squeeze & dry.

In this process, the low substantivity dyeing method according to the invention was employed (1:1 L:R; 30 minutes; 65° C., as shown in FIG. 12) but, at the end of the usual 30 minute dyeing period, dyeing was extended by an additional 15 minutes so as to replicate or mimic a 15 minute wash-off bath. Different temperatures were employed for this additional 15 minute dyeing time, again to mimic the temperatures which can be used for wash-off baths, namely ambient temperature, 50° C., 65° C., 80° C. and 98° C. (see FIGS. 13 to 17). Table 5 summarises the dyeing and wash-off variations used. At the end of 45 minutes dyeing the dyed sample was removed, squeezed and submitted to the first wash-off bath which comprised a 15 minute treatment at 50° C., 65° C., 80° C. or 98° C. using water at a 5:1 L:R (see FIGS. 13 to 15 and 17); in the case of the first room temperature wash-off stage, a 10:1 L:R was used (see FIG. 16). In all cases, the washed-off dyeings were squeezed and then subjected to the second wash-off bath which consisted of a 3 minute treatment with cold water using a 10:1 L:R; the dyeing was then finally squeezed and allowed to dry.

TABLE 5

WASH-OFF PROCESS ACCORDING TO THE INVENTION: DYEING AND WASH-OFF VARIANTS

| Dyeing duration of 1:1 L:R dyeing period/mins | duration of extended dyeing period/mins | #1 Wash-off bath temp of 15 mins extended dyeing/° C. | #2 Wash-off bath wash-off temperature/° C. |
|---|---|---|---|
| 30 | 15 | 65 | room |
| 30 | 15 | 50 | 50 |
| 30 | 15 | 65 | 65 |
| 30 | 15 | 80 | 80 |
| 30 | 15 | 98 | 98 |

Thus, it is seen that the wash-off processes illustrated in FIGS. 13 to 17 comprise a two treatment bath wash-off process using water.

The data presented in Table 2 show the colorimetric data obtained for 2% omf dyeings of C.I. Reactive Black 5 which were carried out using the 1:1 L:R dyeing process depicted in FIG. 12 for 30+15 minutes; the dyeings were then removed, squeezed to remove excess dye liquor and subjected to the various wash-off processes at ambient temperature, 50° C., 65° C., 80° C. or 98° C. (See Table 5 and FIGS. 13 to 17). The corresponding results for the washed-off dyeings are shown in Table 3.

A comparison of the data in Tables 2 and 3 reveals that each of the five new two bath wash-off processes removed surplus (unfixed and hydrolysed) dye; clearly, none of the five new wash-off processes had a deleterious effect upon the hue or chroma of the dyeings either before or after wash-off. It is also evident that the colorimetric co-ordinates of the samples obtained using the five new processes were of very similar hue and chroma to those obtained for the standard 20:1 L:R dyeings as well as the two 1:1 L:R dyeings which had been washed-off using the BASF wash-off process.

The fastness results obtained for the five 30+15 minute dyeings which had been washed-off using the two bath process are presented in Table 4, from which it is apparent that each of the five new wash-off processes imparted high levels of fastness, although the cotton adjacent was lightly stained by vagrant dye and the dyeing underwent a small shade change as a result of washing.

It can therefore be concluded that the very high fastness recorded for the 98° C. wash-off method (Table 4) reflects the very low colour strength of the dyeing before wash-off (see FIG. 18) which resulted from hydrolysis of the dye having occurred during the additional 15 minute dyeing period; thus, the two bath wash-off at 98° C. can be disregarded. Furthermore, it is apparent that there is little difference in terms of colour strength and fastness obtained for the two bath wash-off treatments that were carried out at ambient temperature, 50° C., 65° C. and 80° C. (see Tables 2-4 and FIG. 18). Thus, it appears that room temperature wash-off provides the most attractive proposition from an energy perspective, and no advantage was gained from carrying out the extended 15 minute dyeing time at either 50° C. or 80° C.

It is evident, therefore, that in a particular embodiment, an aspect of the present invention provides a combined 1:1 L:R dyeing/two bath wash-off process which essentially comprises a 1:1 L:R dyeing process carried out at 65° C. for 45 minutes, after which the dyed material is squeezed to remove surplus dye; a first wash-off using water (5:1 L:R) at a temperature from ambient up to 80° C. for 15 minutes, after which the material is again squeezed to remove surplus liquor; and a second wash-off using water (10:1 L:R) for 3 minutes at room temperature, which is followed by a final squeeze and dry.

Hence, in contrast to the wash-off processes of the prior art, the present inventors have provided a novel, two bath, low L:R wash-off process which does not employ any separate rinses with cold water after the wash-off baths. As previously disclosed, the process, which uses only water (i.e. no wash-off agent) is particularly effective when used with dyeings wherein reactive dyes which have been applied to cotton fabric using the novel 1:1 L:R dyeing method according to the invention (typically 30 minutes; 15 gL$^{-1}$ Na$_2$CO$_3$; no electrolyte; tumble dryer). However, since the wash-off of reactive dyes from cellulosic fibres is generally considered to present by far the greatest challenges in terms of (a) the amount of vagrant dye that must be removed (because of the characteristic poor fixation efficiency of the dye class), and (b) the difficulty of removing vagrant dye which stems from the dyes' very high inherent substantivity, which is further exacerbated because of the use of very high amounts of electrolyte in dyeing which serves to enhances dye-fibre substantivity, thereby discouraging dye removal, it is apparent that the process will be appropriate for the wash-off of all dye classes when applied to all fibre types using the novel 1:1 L:R dyeing method according to the present invention.

Thus, a particular embodiment of the present invention provides a combined 1:1 L:R dyeing/two bath wash-off process which, schematically, takes the following form:
Stage 1: Dye at 1:1 L:R and 65° C. for 45 minutes, then squeeze;
Stage 2: First wash-off with water at 5:1 L:R and temperature of ambient up to 80° C. for 15 minutes, then squeeze;
Stage 3: Second wash-off with water at 10:1 L:R and ambient temperature for 3 minutes, then squeeze and dry.

When compared to conventional dyeing and wash-off processes, combined 1:1 L:R dyeing/two bath wash-off processes according to the invention allow for major savings to be achieved in terms of:
Water
    Dyeing:
        Current technology: 12:1 L:R; BAT 5:1 L:R
        1:1 Dyeing method: 1:1 L:R
    Wash-off:
        Current technology: 10-20:1 L:R; 3-4 stages+rinses
        Two bath process: 15:1 L:R total for 2 stages; no additional rinses
Time
    Dyeing:
        Current technology: 90-120 minutes
        1:1 Dyeing method: 45 minutes
    Wash-off:
        Current technology: 90-110 minutes
        Two bath process: 15 minutes
Energy
    Dyeing:
        Current technology: high heating costs for large volume of water (5-12:1 L:R)
        1:1 Dyeing method: low heating costs for low volume of water (1:1 L:R)
    Wash-off:
        Current technology: high heating costs for large volume of water (3-6 baths @ 10-20 L:R)
        Two bath process: low heating costs for low volume of water (1 bath @ 10:1 L:R)
Chemicals
    Dyeing:
        Current technology: 50-100 gL$^{-1}$ electrolyte (@ 20:1 L:R=1000 kg electrolyte per tonne fabric); 15 gL$^{-1}$ Na$_2$CO$_3$ (@ 20:1=300 kg of alkali) 1:1 Dyeing method: zero electrolyte; 15 gL$^{-1}$ Na$_2$CO$_3$ (@ 1:1 L:R=15 kg of alkali)
    Wash-off:
        Current technology: 1-3 gL$^{-1}$ wash-off agent
        Two bath process: zero wash-off agent
Wastewater Treatment Cost
    Dyeing:
        Current technology: large volume (5-12:1 L:R) with high electrolyte and alkali content
        1:1 Dyeing method: low volume (1:! L:R) with zero electrolyte and low alkali content
    Wash-off:
        Current technology: large volume (10-20:1 L:R; 3-4 stages+rinses) with high electrolyte, alkali and wash-off agent content
        Two bath process: low volume (10:1 L:R; 1 stage; no rinses) with zero electrolyte, low alkali and zero wash-off agent content It is apparent that the two bath wash-off process according to the invention is unique insofar as it is applicable to the wash-off of all dye-fibre systems including, for example, reactive dyes/cotton, acid dyes/wool, direct dyes/cotton, etc. Surprisingly, this simple, novel approach offers the opportunity to rationalise both the many and varied dyeing methods and machinery and the wash-off methods and machinery. Clearly, the low L:R wash-off methods produce dyeings of similar wash fastness to those achieved using a conventional wash-off process which uses a proprietary wash-off agent.

As previously observed, the wash-off method according to the second aspect of the invention may be combined with, and is particularly advantageously combined with, the treatment method according to the first aspect of the invention. The advantages associated with such a combination are illustrated in FIG. 11 from which it becomes apparent that the savings in consumption of water and other materials are complemented by equally impressive savings in time of processing, amounting to 2 hours in the present case. As such, the combined dye/wash-off process of the invention offers real potential in being able to simply and systematically overhaul the current, inherently water-, energy- and chemical-inefficient dyeing and wash-off processing of all dye-fibre systems.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

1. Textile Outlook International No 153: December 2011.
2. Johnson, T. F. N., *Current and future market trends in Regenerated Cellulose Fibres*, ed. C. Woodings, ed. R. M. Harrison, 2001, Cambridge: Woodhead.
3. Dos Santos, A. B., Cervantes, F. J. and van Lier, J. B., *Review paper on current technologies for decolourisation of textile wastewaters: Perspectives for anaerobic biotechnology*, Bioresource Technology, 2007, 98(12): p. 2369-2385.
4. BASF. Cyclanon XC-W New: Technical Information TI/T 7196e, August 2008.
5. Anon, *Economic Use of Energy in Wet Processing—An Introduction*. Journal of the Society of Dyers and Colourists, 1979. 95(11): p. 401-403.
6. BASF. Putting Future into textiles: http://www.ekoteks.com/tr/sempozyumPDF/basf.pdf2011.
7. BASF. Cyclanon® XC-W New ensures the greatest effectiveness and delivers customer benefits: http://www.veredlungschemikalien.basf.de/ev-wcms-in/internet/de_DE/function/conversions:/publish/content/EV/EV8/publications/doc/Cyclanon_XC-W_New_EVX_T.pdf2009.

The invention claimed is:

1. A method for the application of a treatment agent to a substrate, said method comprising the treatment of the substrate in an aqueous system comprising the solid particulate treatment agent in a closed container, said treatment being carried out at a ratio of liquor to substrate which does not exceed 2:1,
wherein the substrate is treated with an aqueous liquor comprising said solid particulate treatment agent, wherein said treatment agent is present in said aqueous liquor in partially or wholly dissolved form or partially or wholly suspended or dispersed form,
wherein said substrate comprises a natural or synthetic textile substrate, or a substrate comprising a blend of natural, man-made, synthetic textile fibres or a combination thereof, wherein said natural textile substrate comprises wool, cotton, silk or a combination thereof and said synthetic textile substrate optionally comprises polyester, polyamide, polyalkene, polyacrylonitrile, cellulose di- or tri-acetate or a combination thereof,
wherein said solid particulate treatment agent optionally comprises a powder or pellets,
wherein said solid particulate treatment agent is optionally added to the treatment system at a level in the region of 1-5 % w/w of the substrate being treated;
wherein said solid particulate treatment agent comprises at least one dye;
wherein said method is carried out in the absence of added dye uptake-promoting additives, wherein said added dye-uptake promoting additives are optionally selected from electrolytes, the halide or sulphate salts of alkali metals, the salts of mono-, di-, or tri-carboxylic acids or betaines, acids, buffering agents, acid donor agents, or dispersing agents.

2. A method as claimed in claim 1 wherein said at least one dye is selected from acid dyes, azoic colorants, basic dyes, direct dyes, reactive dyes, disperse dyes, vat dyes and sulphur dyes.

3. A method as claimed in claim 1 wherein said solid particulate treatment agent comprises a textile finishing chemical selected from water-repelling agents, anti-creasing agents, anti-bacterial agents and fluorescent brightening agents.

4. A method as claimed in claim 1 wherein said solid particulate treatment agent comprises at least one bleaching agent.

5. A method as claimed in claim 1 wherein said aqueous system comprises at least one additional assisting agent selected from an alkaline material, an acid, an oxidising agent, a reducing agent and a surfactant.

6. A method as claimed in claim 1 wherein said treatment comprises the wetting out of the substrate using an aqueous liquor comprising said solid particulate treatment agent, said wetting out being carried out at a ratio of liquor to substrate which does not exceed 2:1.

7. A method as claimed in claim 1 wherein said treatment comprises spraying either one or both sides of said substrate with an aqueous liquor comprising said solid particulate treatment agent so as to provide a ratio of liquor to substrate which does not exceed 2:1.

8. A method as claimed in claim 1 wherein said treatment comprises the wetting out of the substrate with water and the subsequent treatment of the wetted out substrate with the solid particulate treatment agent.

9. A method as claimed in claim 1 which is carried out at a temperature in the range of from 20 to 140° C. or at a liquor to substrate ratio of ≤1:1 or wherein said closed container is a sealed dyepot or other sealable dyeing or fabric treatment apparatus, or wherein the aqueous system containing the substrate is agitated during the performance of the method, or wherein said treatment is carried out for a duration of between 10 to 45 minutes.

10. A method as claimed in claim 1 wherein the treated substrate is subsequently washed-off or rinsed or both washed off and rinsed.

11. A method as claimed in claim 10 wherein said method comprises not more than three wash-off treatments of said substrate with water following said application.

12. A method as claimed in claim 11, said method comprising a three-stage process comprising performing, in order, the steps of:
 (a) A first wash-off of the treated substrate with water in a closed container at a ratio of water to substrate which does not exceed 2:1;
 (b) A second wash-off of the treated substrate with water in a closed container at a ratio of water to substrate which does not exceed 2:1; and
 (c) A final wash-off of the treated substrate with water in a closed container at a ratio of water to substrate which does not exceed 20:1.

13. A method as claimed in claim 12 wherein the first and second wash-off steps are carried out at ambient temperature (15-25° C.), whilst the final wash-off step is performed at a temperature of 40-80° C. or wherein the duration of each wash-off step is in the region of from 10-15 minutes.

14. A method as claimed in claim 12 wherein the first and second wash-off steps are carried out at ambient temperature (15-25° C.) for a duration in the region of from 10-15 minutes and the final wash-off step is performed at ambient temperature (15-25° C.) for a duration of 15-45 minutes.

15. A method as claimed in claim 12 wherein the substrate is rinsed with tap water at ambient temperature after each wash-off step.

16. A method as claimed in claim 11, said method comprising a two-stage process comprising performing, in order, the steps of:
 (a) A first wash-off of the treated substrate with water in a closed container at a ratio of water to substrate which does not exceed 5:1; and
 (b) A second wash-off of the treated substrate with water in a closed container at a ratio of water to substrate which does not exceed 10:1.

17. A method as claimed in claim 16 wherein the second wash-off step is performed at ambient temperature of 15-25° C. or wherein the duration of the first wash-off step is in the region of 15 minutes or wherein the second wash-off step is performed for a duration of around 3 minutes.

18. A method as claimed in claim 16 wherein rinsing of the substrate with tap water at ambient temperature after each wash-off step is not carried out.

19. A method as claimed in claim 11 wherein one or more of said wash-off processes is performed in the absence of added auxiliary treatment agents.

20. A method for the application of a treatment agent to a substrate, said method comprising the treatment of the substrate in an aqueous system comprising the solid particulate treatment agent in a closed container, said treatment being carried out at a ratio of liquor to substrate which does not exceed 2:1,
 wherein the substrate is treated with an aqueous liquor comprising said solid particulate treatment agent, wherein said treatment agent is present in said aqueous liquor in partially or wholly dissolved form or partially or wholly suspended or dispersed form,
 wherein said substrate comprises a natural or synthetic textile substrate, or a substrate comprising a blend of natural, man-made, synthetic textile fibres or a combination thereof, wherein said natural textile substrate comprises wool, cotton, silk or a combination thereof and said synthetic textile substrate optionally comprises polyester, polyamide, polyalkene, polyacrylonitrile, cellulose di- or tri-acetate or a combination thereof,
 wherein said solid particulate treatment agent optionally comprises a powder or pellets,
 wherein said solid particulate treatment agent is optionally added to the treatment system at a level in the region of 1-5 % w/w of the substrate being treated,
 wherein the treated substrate is subsequently washed-off or rinsed or both washed off and rinsed, said method comprising not more than three wash-off treatments of said substrate with water following said application and wherein one or more of said wash-off processes is performed in the absence of added auxiliary treatment agents.

21. A method for the application of a treatment agent to a substrate, said method comprising the treatment of the substrate in an aqueous system comprising the solid particulate treatment agent in a closed container, said treatment being carried out at a ratio of liquor to substrate which does not exceed 2:1,
 wherein the substrate is treated with an aqueous liquor comprising said solid particulate treatment agent, wherein said treatment agent is present in said aqueous liquor in partially or wholly dissolved form or partially or wholly suspended or dispersed form,
 wherein said substrate comprises a natural or synthetic textile substrate, or a substrate comprising a blend of natural, man-made, synthetic textile fibres or a combination thereof, wherein said natural textile substrate comprises wool, cotton, silk or a combination thereof and said synthetic textile substrate optionally comprises polyester, polyamide, polyalkene, polyacrylonitrile, cellulose di- or tri-acetate or a combination thereof,
 wherein said solid particulate treatment agent optionally comprises a powder or pellets, wherein said solid particulate treatment agent is optionally added to the treatment system at a level in the region of 1-5 % w/w of the substrate being treated,
 wherein said solid particulate treatment agent comprises at least one bleaching agent.

* * * * *